(12) United States Patent
Hu et al.

(10) Patent No.: US 12,736,830 B2
(45) Date of Patent: Sep. 15, 2026

(54) AUTOSTEREOSCOPIC DISPLAY DEVICE

(71) Applicant: JoyVision Technology., CO LTD, Taoyuan City (TW)

(72) Inventors: Cheng-Chung Hu, Taoyuan City (TW); Hsiu-Hung Lin, New Taipei City (TW)

(73) Assignee: JOYVISION TECHNOLOGY., CO LTD., Taoyuan City (TW)

( * ) Notice: Subject to any disclaimer, the term of this patent is extended or adjusted under 35 U.S.C. 154(b) by 0 days.

(21) Appl. No.: 19/453,099

(22) Filed: Jan. 20, 2026

(65) Prior Publication Data

US 2026/0211262 A1 Jul. 23, 2026

Related U.S. Application Data

(63) Continuation-in-part of application No. 19/214,113, filed on May 21, 2025.

(30) Foreign Application Priority Data

Jan. 23, 2025 (TW) ................................ 114103146
Aug. 19, 2025 (TW) ................................ 114131639

(51) Int. Cl.

| | |
|---|---|
| ***G02B 30/27*** | (2020.01) |
| ***G02F 1/1335*** | (2006.01) |
| ***G02F 1/1337*** | (2006.01) |
| ***G09G 3/00*** | (2006.01) |
| ***G09G 3/36*** | (2006.01) |

(52) U.S. Cl.
CPC ....... *G02B 30/27* (2020.01); *G02F 1/133526* (2013.01); *G02F 1/133528* (2013.01); *G02F 1/1337* (2013.01); *G09G 3/003* (2013.01); *G09G 3/36* (2013.01)

(58) Field of Classification Search
CPC ............... G02B 30/27; G02F 1/133526; G02F 1/133528; G02F 1/1337; G09G 3/003; G09G 3/36
See application file for complete search history.

(56) References Cited

U.S. PATENT DOCUMENTS

2006/0023143 A1* 2/2006 Lee ........................ G02B 30/25 348/E13.044
2013/0107174 A1* 5/2013 Yun ........................ G02B 30/28 349/200

* cited by examiner

*Primary Examiner* — Anne M Hines
*Assistant Examiner* — Jose M Diaz
(74) *Attorney, Agent, or Firm* — McClure, Qualey & Rodack, LLP

(57) ABSTRACT

An autostereoscopic display comprises an array of display pixels arranged in rows and columns, and a liquid crystal lens structure disposed over the display pixel array. The liquid crystal lens structure includes an array of elongated lens units, each having a lens direction extending across a column direction of the display pixel array. An alignment layer has a rubbing direction oriented substantially perpendicular to the lens direction. A half-wave plate is disposed between the display pixel array and the liquid crystal lens structure and is configured to rotate a polarization direction of transmitted light such that the polarization direction is substantially parallel to the rubbing direction.

5 Claims, 17 Drawing Sheets

11
11
L1
R1
5
X
Y

Y
X
Z
5
L1
R1
L2
R2

301
31
300
X
Y
302
5
7
7
7

Y
L1
R1
X
Z
7
EX
7

| Color | wavelengths |
| --- | --- |
| Red | 625~740nm |
| Green | 500~565nm |
| Blue | 440~485nm |

I1
I2
I1
I2
I1
I2
901
902
Frame f1
G1
G2
I20
100
Frame f2
G1
G2

Frame f1

Frame f2

Frame f2

Frame f3

AUTOSTEREOSCOPIC DISPLAY DEVICE

CROSS-REFERENCE TO RELATED APPLICATIONS

This non-provisional application claims priority to Taiwan Patent Application No. 114103146, filed on Jan. 23, 2025, and Taiwan Patent Application No. 114131639, filed on Aug. 19, 2025. This application is also a continuation-in-part of U.S. patent application Ser. No. 19/214,113, filed on May 21, 2025. The entire contents of each of the above-identified applications are hereby incorporated by reference herein.

PRIOR ART

In order to enable a viewer to perceive three-dimensional (3D) depth without the need to wear special eyewear, various autostereoscopic display technologies have been proposed. Conventional approaches primarily employ lenticular lenses. In one commonly adopted implementation, a lenticular lens array is disposed in front of a display panel so as to direct different groups of pixels toward a viewer's left eye and right eye, respectively. Such techniques are described, for example, in U.S. Pat. No. 4,959,641, which discloses a stereoscopic display system capable of providing parallax images, thereby allowing a viewer to perceive 3D visual depth without wearing stereoscopic glasses. However, display devices based on lenticular lenses suffer from several drawbacks, including limited viewing angles, reduced image resolution, and color distortion. By contrast, liquid-crystal lens technologies—such as those disclosed in Chinese Patent Grant Publication No. CN104597685B—provide an alternative solution, in which image separation may be achieved by dynamically controlling optical characteristics of a liquid-crystal layer.

BACKGROUND OF THE INVENTION

The present invention relates to an autostereoscopic display device, and more particularly to an improved liquid-crystal lens configured to enhance stereoscopic display performance.

SUMMARY OF THE INVENTION

The present invention achieves precise separation of left-eye images and right-eye images by dynamically controlling optical paths using a liquid-crystal lens, thereby improving stereoscopic visual quality. The apparatus of the present invention includes a display pixel array arranged orthogonally along a row direction and a column direction, and a liquid-crystal lens structure disposed above the display pixel array. The liquid-crystal lens structure comprises a plurality of elongated lens units extending parallel to one another and having a lens direction extending across the row direction.

Under optical operation, each lens unit is configured to form multiple pixel groups and to define boundaries between adjacent pixel groups, thereby producing the multi-view separation effect required for stereoscopic image generation. In one important aspect of the present invention, a PI (polyimide) alignment layer is provided within the liquid-crystal lens structure, and an alignment direction of the PI alignment layer is formed by rubbing so as to be substantially perpendicular to the lens direction. This rubbed alignment orientation enables liquid-crystal molecules within the lens layer to assume a stable and uniform alignment, thereby defining an effective optical axis of the liquid-crystal lens under an applied electric field.

Accordingly, when incident light enters the liquid-crystal lens with a polarization direction substantially parallel to the alignment direction of the liquid-crystal molecules, optimal optical efficiency and reduced polarization-induced optical loss can be achieved. To achieve the above-described polarization matching, the present invention further disposes a half-wave plate between the liquid-crystal panel and the liquid-crystal lens structure. The half-wave plate is configured to rotate a polarization direction of incident linearly polarized light such that the rotated polarization direction is precisely aligned with an alignment direction of the alignment layer. In other words, after passing through the half-wave plate, the polarization direction of the incident light is adjusted to be parallel to the alignment direction of the alignment layer formed in the liquid-crystal panel. The alignment direction of the alignment layer is, in turn, arranged to be substantially perpendicular to the lens direction of the liquid-crystal lens. Accordingly, the incident light is allowed to enter the liquid-crystal lens along an optimal polarization orientation corresponding to an optical axis of the liquid-crystal lens.

By virtue of the foregoing polarization-control mechanism, the liquid-crystal lens is able to modulate the incident light in an optimal manner, while effectively reducing optical crosstalk, luminance degradation, contrast reduction, and other adverse effects caused by polarization mismatch. By calibrating the polarization direction of the incident light to be parallel to the alignment direction of the polyimide (PI) alignment layer, which alignment direction is further arranged to be perpendicular to the lens direction, the present invention ensures that the liquid-crystal lens operates under optimal polarization conditions, thereby significantly improving stereoscopic image quality.

DETAILED DESCRIPTION OF THE INVENTION

The embodiments of the present invention will be described in detail below with reference to the accompanying drawings. In the following detailed description, numerous specific details are set forth to provide a clearer understanding of the technical features of the present invention. However, it will be apparent to those having ordinary skill in the art that the present invention may be practiced without reliance on these specific details. In other instances, detailed descriptions of well-known methods or components are omitted so as not to obscure the essential concepts of the present invention.

Figure 1A:
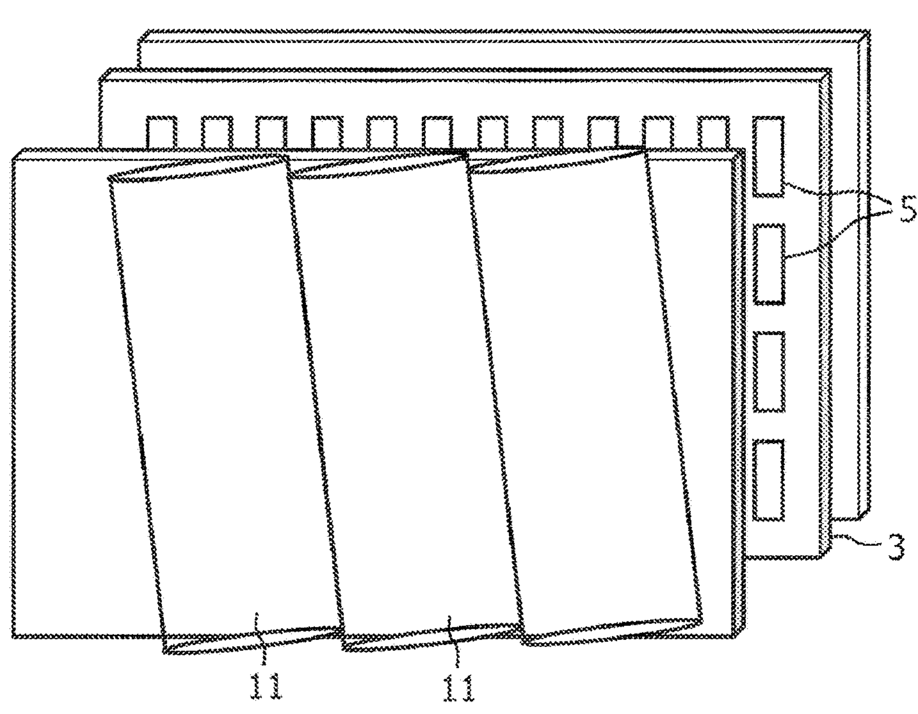
FIGS. 1A-1B illustrate a display system in which display pixels are arranged in rows and columns, and optical elements are disposed to overlie the display pixels.
Figure 1B:
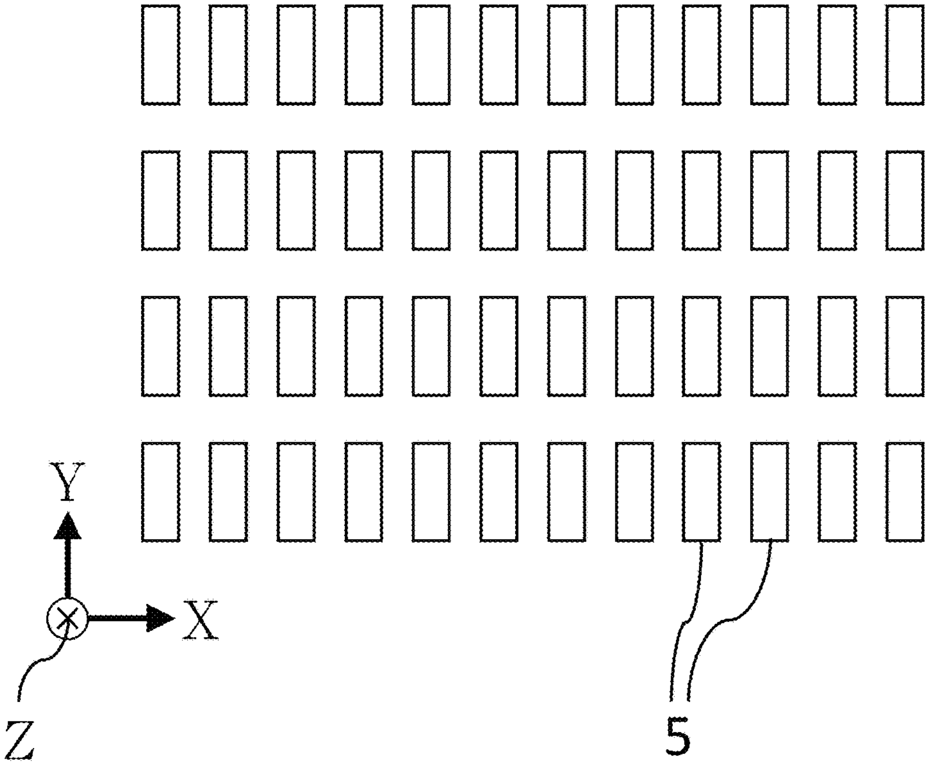

As illustrated in FIGS. 1A and 1B, a conventional autostereoscopic display device includes a display pixel array 3. The display pixel array 3 comprises a plurality of display pixels 5 arranged in rows and columns extending respectively along a row direction (X-axis) and a column direction (Y-axis). In addition, an array of optical elements 11 is disposed above the display pixel array 3 along a direction perpendicular to the X-axis and the Y-axis (i.e., along a Z-axis direction). The optical elements 11 extend parallel to one another and overlie the display pixel array 3.

Figure 2A:
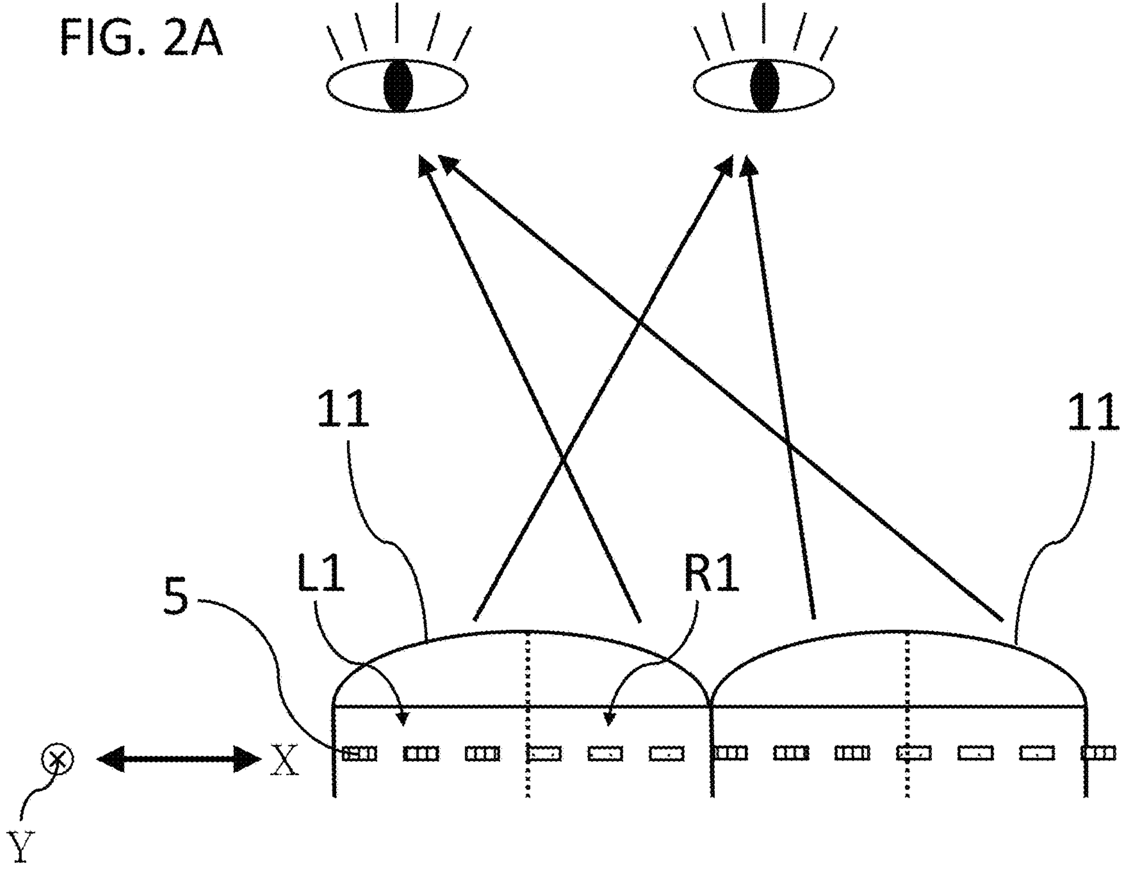
FIGS. 2A-2B illustrate a display system configured to direct different images toward a viewer's left eye and right eye, respectively, and schematically show how different pixel groups are guided by optical elements to achieve a stereoscopic display effect.
Figure 2B:
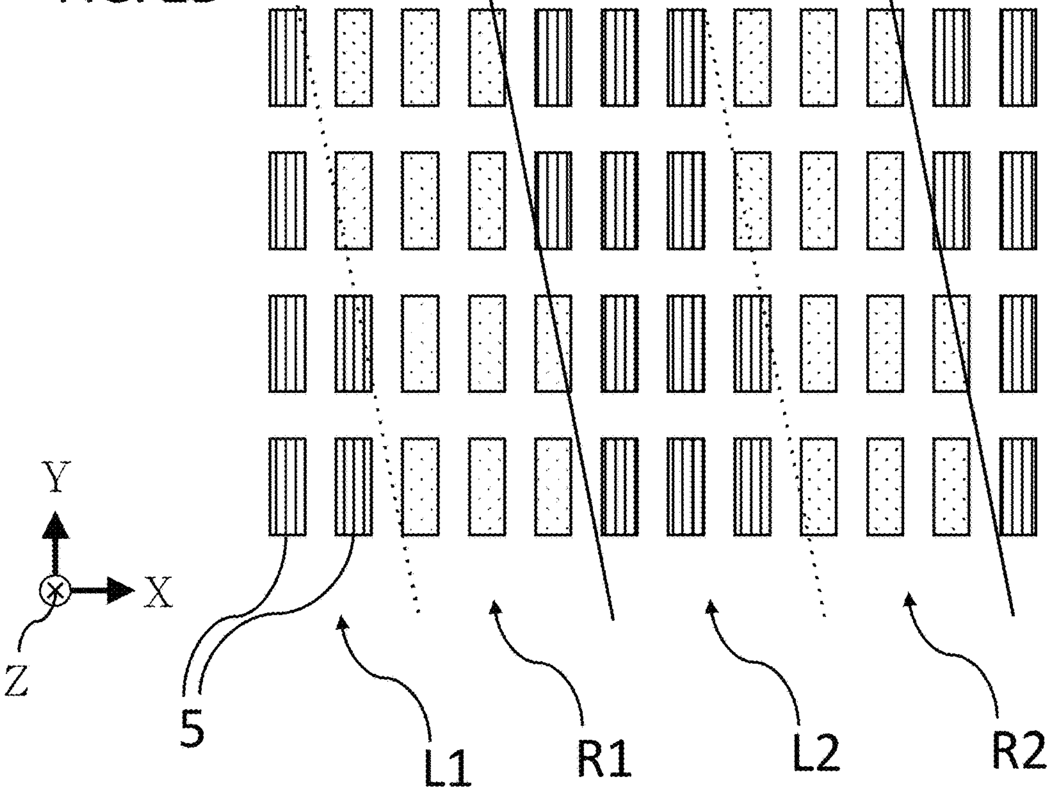

As shown in FIGS. 2A and 2B, different pixel groups (for example, pixel groups R1, R2, L1, and L2) may be directed to a viewer's left eye and right eye via the optical elements 11, thereby enabling glasses-free stereoscopic three-dimensional (3D) display. Techniques for directing different images to the left and right eyes may be found, for example, in U.S. Pat. No. 4,959,641, which discloses a stereoscopic display system capable of generating at least one pair of parallax images such that a viewer can perceive three-dimensional depth without wearing special glasses. The fundamental principle involves displaying two or more images having slight differences (parallax), such that the viewer's left and right eyes receive different images, thereby producing a stereoscopic visual perception.

The optical elements 11 are arranged at a predetermined inclination angle relative to the column direction (Y-axis) of the display pixels so as to optimize image separation performance. With this configuration, multiple pixel groups (for example, R1, R2, L1, and L2) may be repeatedly formed across the display surface, each pixel group being composed of adjacent display pixels 5. When a barrier or a lenticular lens having no inclination angle is used to generate multi-view images, the effective resolution of each view is reduced in the horizontal direction, while the resolution in the vertical direction remains unchanged. By introducing an inclination angle to the barrier or the lenticular lens, the resolution loss can be distributed between the horizontal and vertical directions, thereby improving overall image quality in practical applications.

The optical elements 11 may alternatively be implemented as liquid-crystal lenses, each including a plurality of lens units configured to form multiple pixel groups. Under optical operation, each optical elements 11 is configured to form multiple pixel groups and to define boundaries between adjacent pixel groups, thereby producing the multi-view separation effect required for stereoscopic image generation. However, crosstalk may occur at the image boundaries. For any given pixel, an optimal brightness level may be determined based on a distance between the pixel and a nearest end of a boundary separating adjacent images. A processor may be configured to perform related operations, such as obtaining the distance between a display pixel and the nearest end of a boundary used to separate adjacent images. The display device may adjust pixel brightness according to the positional relationship of the pixel relative to the image boundary, such that the brightness of pixels located near the boundary is appropriately reduced. Such a method of dynamically adjusting pixel brightness based on the distance between pixels and image boundaries may be implemented in accordance with the techniques described in U.S. Pat. No. 12,366,765B1.

Figure 3A:
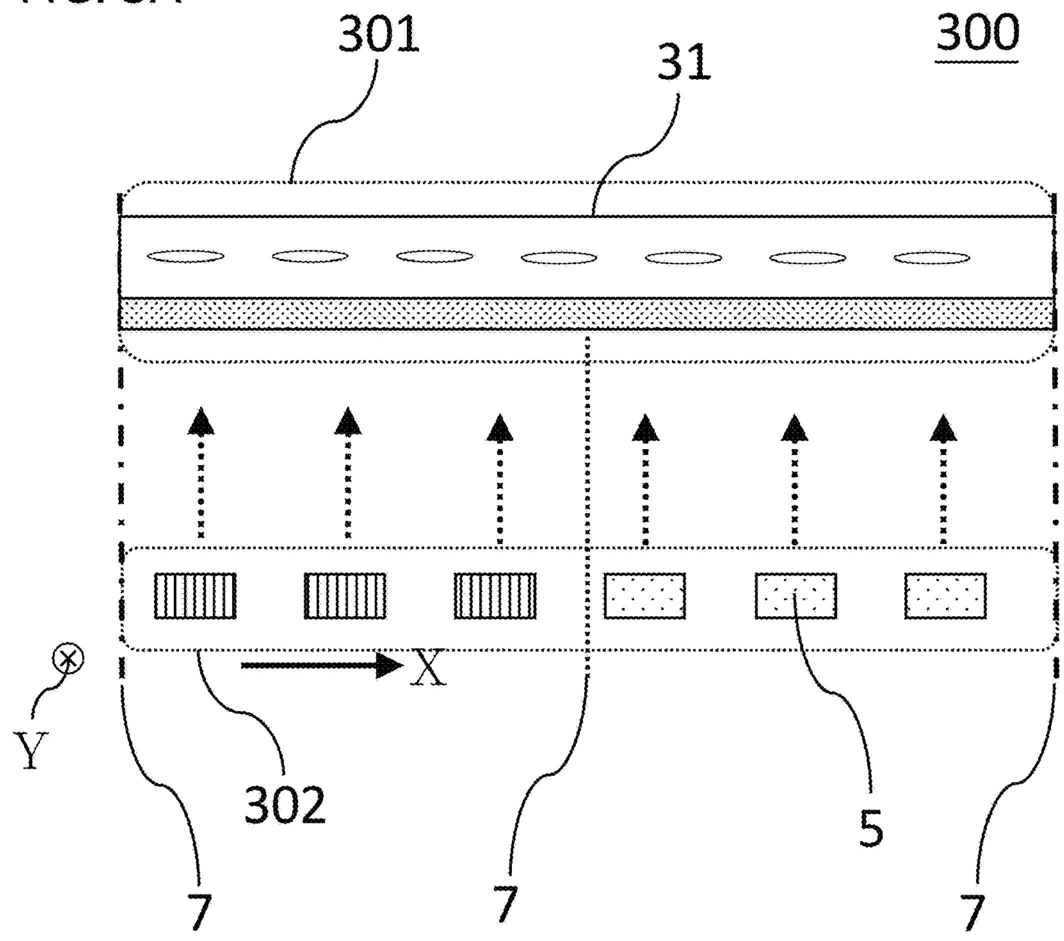
FIGS. 3A-3B illustrate an embodiment of a display device including a liquid-crystal lens structure comprising lens units formed of liquid-crystal material.

As illustrated in FIG. 3A, in one embodiment, an optical element of a display device 300 is implemented as a liquid crystal lens 301. The liquid crystal lens is an electrically controllable optical component capable of reorienting liquid crystal molecules under an applied electric field so as to modulate a refractive-index distribution of a liquid crystal layer, thereby achieving optical functions such as focusing or zooming. The liquid crystal lens 301 includes a plurality of electrically controllable lens units, wherein the liquid crystal layer is disposed between a first electrode layer and a second electrode layer. By applying a potential difference across the liquid crystal layer, a spatially graded refractive-index distribution is generated within the liquid crystal layer so as to produce a lens effect. Furthermore, by adjusting the applied electric potentials, characteristics of the lens units—such as size, shape, or orientation—may be selectively controlled.

Figure 3B:
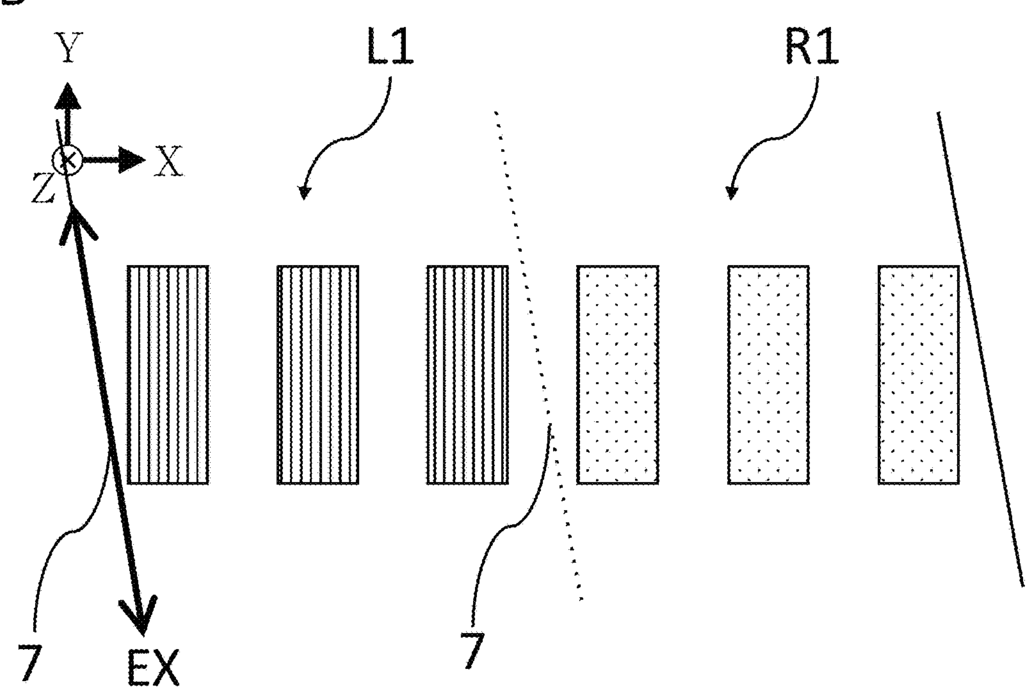

Based on the above structure, and as shown in FIGS. 3A and 3B, the display device 300 further includes a display panel 302 configured to generate images. A plurality of display pixels 5 in the display panel 302 are arranged along a row direction X and a column direction Y. The liquid crystal lens 301 disposed above the display panel 302 includes a plurality of elongated lens units 31 extending parallel to one another along a lens direction EX, wherein the lens direction EX intersects the column direction Y (or the row direction X). During optical imaging operation, the lens units 31 are configured to optically group the display pixels into multiple pixel groups (for example, R1, L1, etc.) on the display panel, and to define optical boundaries 7 between adjacent pixel groups, thereby producing the multi-view separation effect required for autostereoscopic image display.

Figure 4:
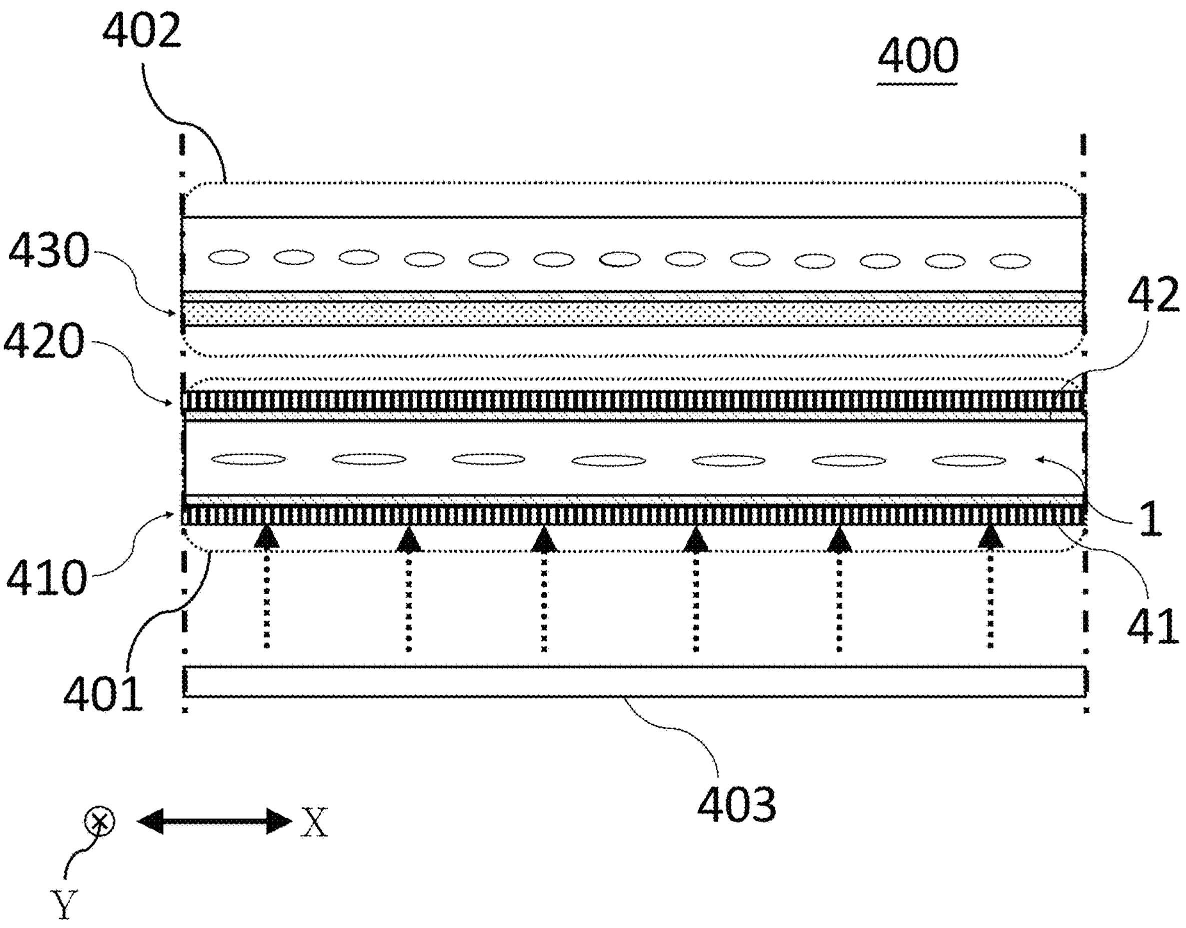
FIG. 4 illustrates an embodiment in which a half-wave plate is disposed above a twisted-nematic (TN) structure or a similar configuration, in which liquid-crystal molecules rotate a polarization direction of light passing therethrough.

As shown in FIG. 4, in another embodiment, image generation may be implemented using a liquid-crystal panel 401. To enhance brightness and visibility, the liquid-crystal panel 401 may include a first alignment layer 41 and a first liquid-crystal layer 1 disposed between the first alignment layer 41 and a second alignment layer 42. The alignment direction of the first alignment layer 41 is substantially orthogonal to the alignment direction of the second alignment layer 42, thereby supporting a twisted-nematic (TN) configuration in which liquid-crystal molecules rotate the polarization direction of light as the light passes therethrough. The autostereoscopic display device 400 may further include a backlight module 403, a first polarizer 410 disposed between the backlight module 403 and the first alignment layer 41, and a second polarizer 420 disposed above the second alignment layer 42. In addition, a half-wave plate 430 may be disposed above the second polarizer 420.

A liquid-crystal lens has an optical axis determined by the principal alignment orientation of liquid-crystal molecules. Since liquid-crystal materials are birefringent, a liquid-crystal lens exhibits optimal optical performance for incident light having a polarization direction aligned with the optical axis. When the polarization direction of incident light is not aligned with the optical axis, the effective refractive-index distribution of the lens may be adversely affected, resulting in focal-length deviation and image crosstalk. Therefore, in order to align the polarization direction of incident light with the optical axis of the liquid-crystal lens, a polarization-compensation element—such as a half-wave plate—may be employed to rotate the polarization direction of the incident light, thereby ensuring optimal imaging performance of the liquid-crystal lens.

An array of liquid-crystal lens units may be disposed above the half-wave plate 430. The array includes a plurality of lens units extending along a lens direction EX and forming multiple pixel groups separated by image boundaries between adjacent images. The lens units extend parallel to one another and overlie the display pixels. Each lens unit has a lens direction EX extending across the pixel row direction and is arranged at a fixed inclination angle relative to the row direction of the pixel array. As illustrated in FIG. 6B, a third alignment layer disposed within the liquid-crystal layer of the liquid-crystal lens 402 has an alignment direction R that is substantially perpendicular to the lens direction EX. The third alignment layer is disposed between the half-wave plate 430 and the liquid-crystal layer of the liquid-crystal lens 402.

In liquid-crystal displays (LCDs), the term "alignment direction" generally refers to a predetermined orientation imparted to liquid-crystal molecules by an alignment layer. The alignment layer is typically a polymer thin film formed on a substrate surface, the surface of which is subjected to a mechanical rubbing process to create fine micro-groove structures. The rubbing process may be performed by sweeping a velvet cloth or a similar material across the surface of the alignment layer in a single direction, thereby causing molecular chains on the surface to become regularly aligned along that direction.

After rubbing, the alignment layer exerts surface anchoring forces on adjacent liquid-crystal molecules, causing the liquid-crystal molecules to tend to align uniformly along the rubbing direction (i.e., the alignment direction) in the absence of an externally applied electric field. As a result, the liquid-crystal layer exhibits stable and predictable optical characteristics in an initial state. Such an alignment process is a critical step for achieving stable optical response and proper display operation in liquid-crystal devices.

Because the lens units of the liquid-crystal lens in the present invention are arranged at a fixed inclination angle relative to a row direction of a display-pixel array, an effective optical axis formed by the liquid-crystal lens under an applied operating electric field does not necessarily coincide with an optical axis of a polarizer disposed on the liquid-crystal panel. When a polarization direction of incident light is not aligned with the effective optical axis of the liquid-crystal lens, polarization mismatch is likely to occur, which may lead to degraded polarization control performance, reduced contrast ratio, increased optical noise, and even image crosstalk or overall degradation of display quality.

To address the foregoing issues, the present invention disposes a half-wave plate between the polarizer and the liquid-crystal lens. The half-wave plate is configured to rotate a polarization direction of linearly polarized light emitted from the polarizer, such that the rotated polarization direction is aligned with the effective optical axis of the liquid-crystal lens.

By appropriately setting a fast-axis angle of the half-wave plate, polarization-axis mismatch between the polarizer and the liquid-crystal lens can be effectively compensated. Through the above-described polarization compensation mechanism, the present invention significantly improves a polarization state of light incident on the liquid-crystal lens, enhances polarization utilization efficiency, and reduces optical distortions caused by polarization mismatch. As a result, the display device achieves higher contrast, improved luminance uniformity, and superior overall image quality. In addition, such an optical-axis alignment mechanism helps reduce crosstalk during stereoscopic display operation, thereby enabling clearer and more stable stereoscopic visual effects in multi-view autostereoscopic display modes.

Based on the foregoing structure, as illustrated in FIG. 4, a half-wave plate 430 is disposed between the polarizer 420 and the liquid-crystal lens 402. Because the lens units of the liquid-crystal lens are arranged at a fixed inclination angle relative to a row direction of the display pixel array, liquid-crystal molecules within the liquid-crystal lens are reoriented along a predetermined alignment direction under an applied driving electric field. As a result, an anisotropic refractive-index distribution is formed within the liquid-crystal layer, thereby establishing an effective optical axis associated with a principal molecular alignment direction of the liquid-crystal molecules.

This effective optical axis is generally not coincident with a transmission axis of the polarizer 420 disposed in the liquid-crystal panel. When a polarization direction of light incident on the liquid-crystal lens is not aligned with the effective optical axis, the birefringent nature of the liquid-crystal material causes reduced polarization-coupling efficiency, resulting in polarization mismatch. Such polarization mismatch may manifest as reduced contrast ratio, luminance loss, increased optical noise, and even image crosstalk, thereby degrading overall display quality. To address the above issues, the present invention introduces the half-wave plate 430 to rotate a polarization direction of linearly polarized light output from the polarizer 420, such that the rotated polarization direction is aligned with the effective optical axis formed in the liquid-crystal lens under the applied electric field, thereby achieving polarization compensation.

Specifically, when a fast axis of the half-wave plate 430 forms an angle $\theta$ with respect to an incident linear polarization direction, the polarization direction after passing through the half-wave plate is rotated by $2\theta$. By appropriately selecting an orientation angle of the fast axis of the half-wave plate 430, the rotated polarization direction can be made substantially coincident with the effective optical axis determined by the molecular alignment of the liquid-crystal lens.

Accordingly, the polarization direction of transmitted light is further maintained substantially parallel to an alignment direction R of a third alignment layer, thereby significantly reducing polarization mismatch effects. Through the above-described polarization-compensation and optical-axis-matching mechanism, the present invention effectively improves a polarization state of light incident on the liquid-crystal lens, enhances polarization utilization efficiency, and reduces optical distortions caused by polarization mismatch.

As a result, the display device achieves higher contrast, improved luminance uniformity, and significantly reduced crosstalk during multi-view autostereoscopic display operation, thereby providing a more stable and clearer glasses-free stereoscopic visual experience.

Figure 5:
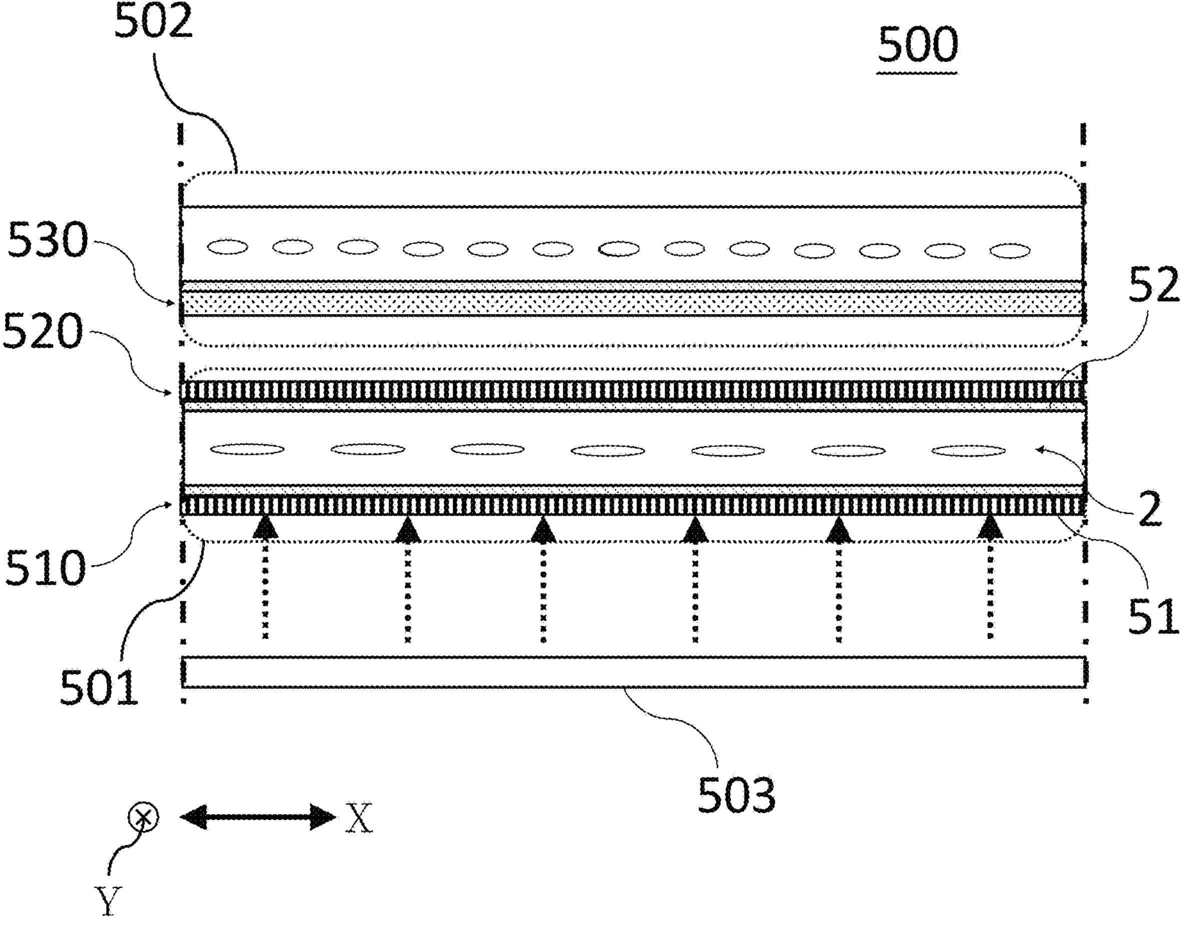
FIG. 5 illustrates another embodiment of a display device.

As shown in FIG. 5, in another embodiment a display device 500 may include a liquid-crystal panel 501 for displaying images. The liquid-crystal panel 501 may include a first alignment layer 51 and a liquid-crystal layer 2 disposed between the first alignment layer 51 and another alignment layer 52. The alignment layer 52 is disposed above the alignment layer 51, and the alignment direction of the alignment layer 51 is substantially orthogonal to the alignment direction of the alignment layer 52.

The display device 500 may further include a backlight module 503, and a polarizer 510 disposed between the backlight module 503 and the alignment layer 51. The polarizer 510 is configured to cause a polarization direction of light entering the liquid-crystal layer 2 to be substantially parallel to the alignment direction of the alignment layer 51. Another polarizer 520 may be disposed above the alignment layer 52, such that a polarization direction of light exiting the liquid-crystal layer 2 is substantially parallel to the alignment direction of the alignment layer 52.

A liquid-crystal lens 502 is disposed above the polarizer 520 and may be arranged at a predetermined fixed inclination angle relative to a pixel row direction X or a pixel column direction Y of the display surface (for example, as shown in FIG. 3B). A half-wave plate 530 is disposed between the liquid-crystal lens 502 and the liquid-crystal panel 501, configured to cause a polarization direction of light entering the liquid-crystal lens 502 to be substantially parallel to an alignment direction of an alignment layer within a second liquid-crystal layer of the liquid-crystal lens 502. An angular difference between an optical axis of the polarizer 520 and an input optical axis of the liquid-crystal lens 502 is approximately twice an angular difference between the optical axis of the polarizer 520 and an optical axis of the half-wave plate 530.

Figure 6A:
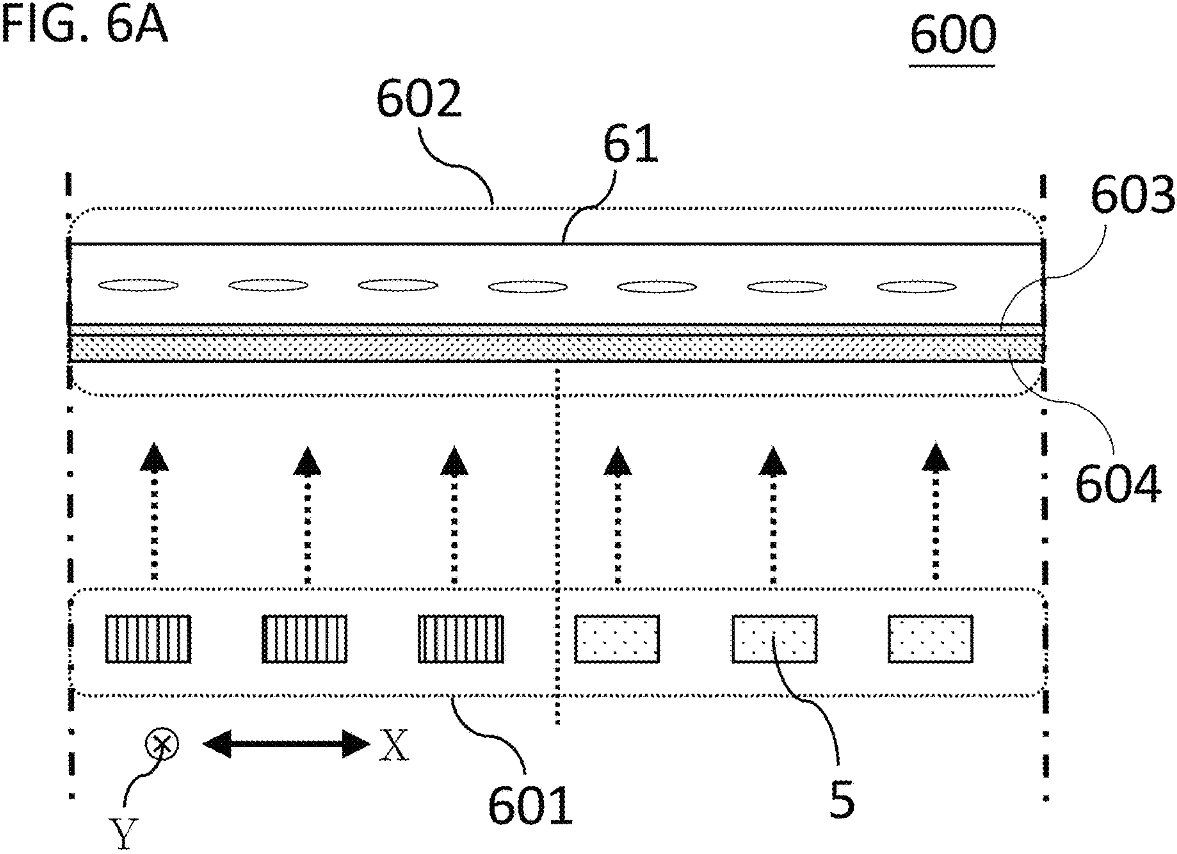
FIGS. 6A and 6B illustrate an embodiment including a third alignment layer having a predetermined alignment direction substantially perpendicular to a lens direction.
Figure 6B:
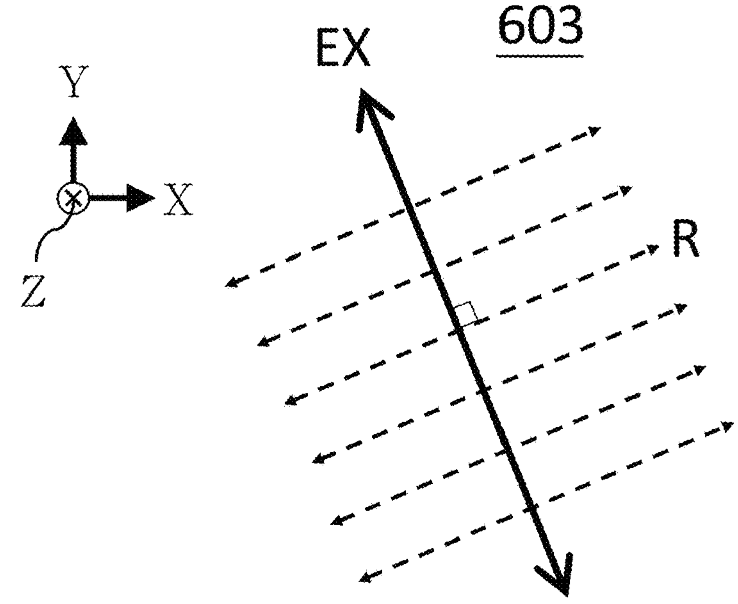

As shown in FIGS. 6A and 6B, in another embodiment, an autostereoscopic display device 600 includes a plurality of display pixels 5 arranged in a matrix configuration, that is, an image is divided into multiple pixels arranged in a two-dimensional matrix, with each pixel carrying color values such as RGB components. The display pixels 5 may be provided by a liquid crystal display (LCD) panel, an organic light-emitting diode (OLED) panel, or other suitable display technologies 601. Disposed above the display pixels 5 is a liquid-crystal lens structure 602, which includes a plurality of elongated liquid-crystal lens units 61. The lens units 61 extend parallel to one another along a lens direction EX that intersects a column direction Y of the display-pixel array.

The liquid-crystal lens structure 602 further includes a third alignment layer 603. The third alignment layer 603 is subjected to an alignment treatment to form a specific alignment direction R, and the alignment direction R is substantially perpendicular to the lens direction EX. Such an alignment configuration ensures that liquid-crystal molecules within the liquid-crystal lens structure 602 assume a correct and stable orientation, thereby providing the optical characteristics required for stereoscopic image separation. A half-wave plate 604 is disposed between the display pixels 5 and the liquid-crystal lens units 61. The half-wave plate 604 is configured to rotate a polarization direction of transmitted light so as to align the polarization direction with the alignment direction R. Through such polarization control, the optical performance of the liquid-crystal lens is optimized, thereby improving image clarity and contrast.

Figures 7A, 7B:
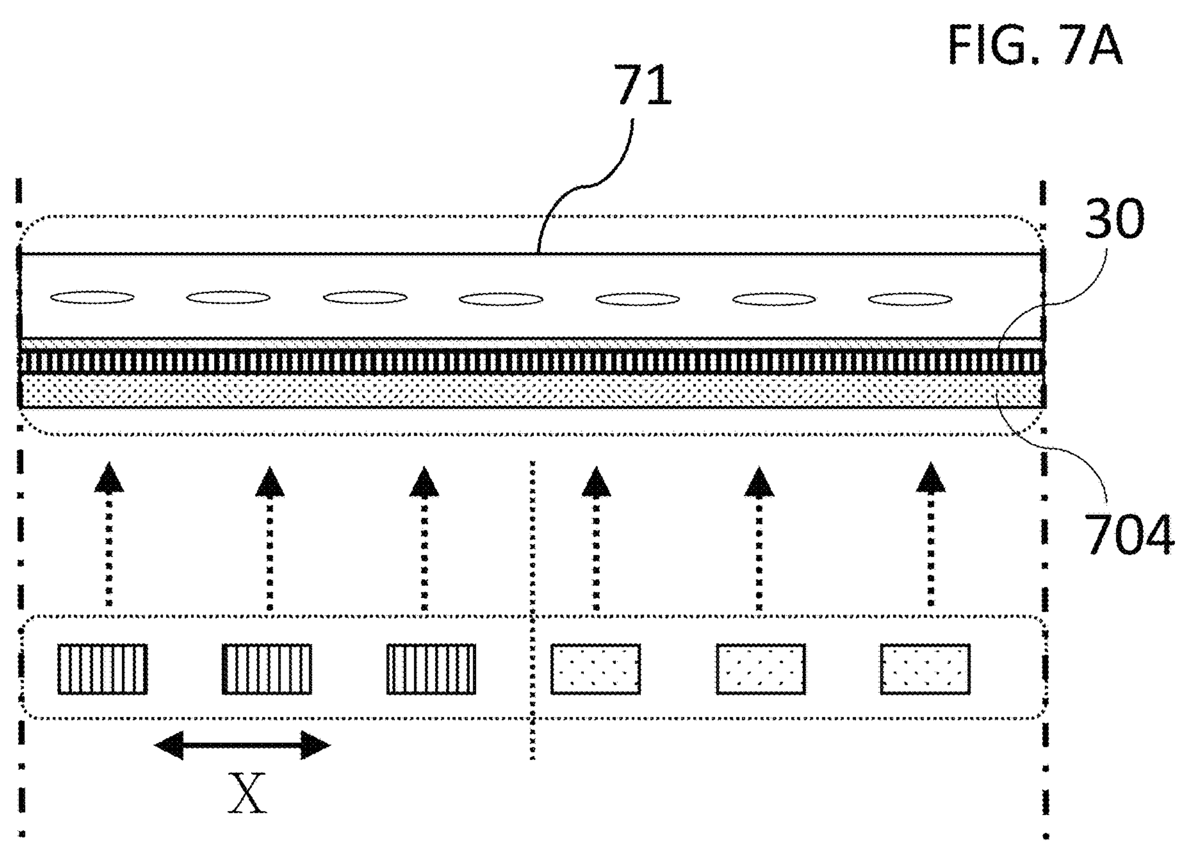
FIGS. 7A and 7B illustrate an embodiment in which a third polarizer is incorporated to ensure a consistent polarization direction of light entering a liquid-crystal lens.

As shown in FIG. 7A, in another embodiment, the autostereoscopic display device may further include a third polarizer 30 disposed between the half-wave plate 704 and the liquid-crystal layer of the lens units 71. The third polarizer 30 is configured to filter out polarization components that are not aligned with its transmission axis, such that only linearly polarized light having a polarization direction aligned with the transmission axis is allowed to pass. By ensuring that light entering the liquid-crystal lens has a uniform polarization direction, the polarization quality can be further improved.

As shown in FIG. 7B, commercially available half-wave plates are typically optimized to provide ideal phase retardation at approximately 540 nm (the green-light wavelength band). However, for red-light and blue-light wavelength bands, the phase retardation may deviate from the ideal value of 180 degrees ($\pi$ radians), causing the transmitted light to deviate from a linear polarization state and become elliptically polarized. By introducing the third polarizer 30, elliptically polarized or circularly polarized components can be filtered out, allowing only linearly polarized light aligned with the transmission axis to pass. Accordingly, even when the incident light is circularly polarized or elliptically polarized, the light ultimately entering the liquid-crystal lens can still be maintained in a linearly polarized state.

In one embodiment, when a fast axis of a half-wave plate forms an angle $\theta$ with respect to a polarization direction of incident light, the half-wave plate rotates the polarization direction of the incident light by $2\theta$. It should be understood that the half-wave plate ($\lambda/2$ plate) employed in the present invention is used to rotate the polarization direction of linearly polarized light without changing the type of polarization state. For example, when linearly polarized light is incident at an angle of 45° relative to an optical axis of the half-wave plate, the polarization direction of the light is rotated by twice the incident angle.

By contrast, a quarter-wave plate ($\lambda/4$ plate) introduces a phase difference of 90° ($\pi/2$ radians) between two orthogonal polarization components, thereby converting linearly polarized light into circularly polarized light, or converting circularly polarized light into linearly polarized light. For example, when linearly polarized light is incident at an angle of 45° relative to an optical axis of a $\lambda/4$ plate, the output light becomes circularly polarized. Conversely, when circularly polarized light passes through a $\lambda/4$ plate having an appropriately oriented optical axis, it may be converted back into linearly polarized light. In another embodiment, a $\lambda/4$ plate may also be used to adjust polarization states so as to improve light transmission efficiency and reduce crosstalk in stereoscopic or multi-view display processes. In comparison, the half-wave plate ($\lambda/2$ plate) is primarily used to rotate the polarization direction. Although both the half-wave plate and the quarter-wave plate are birefringent optical elements, their functions and roles within an optical system are different.

Figure 8A:
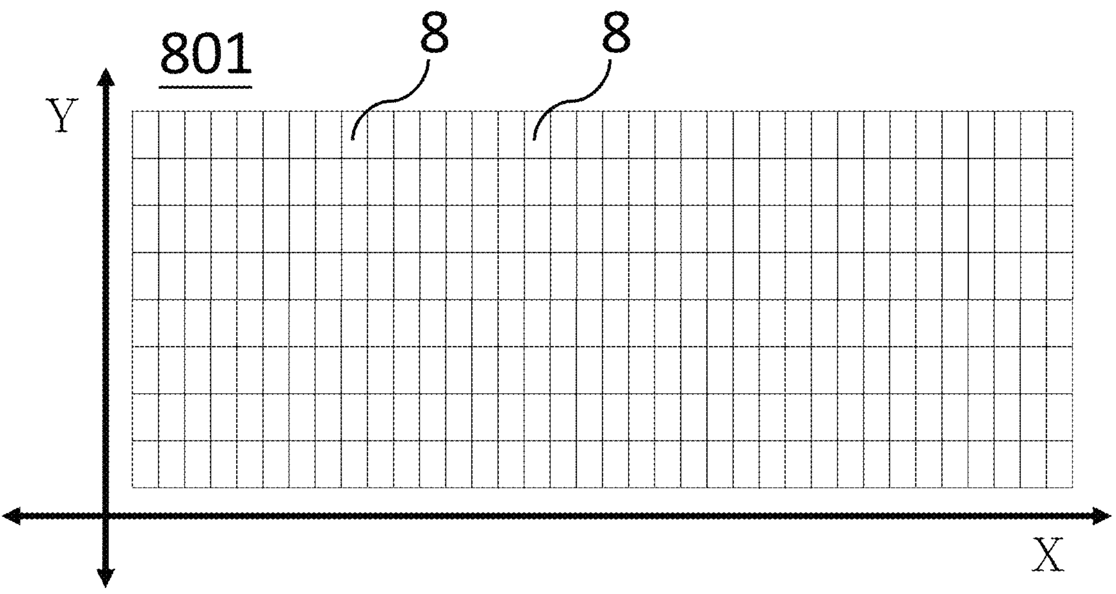
FIGS. 8A through 8D illustrate an embodiment in which a half-wave plate is configured to rotate a polarization direction of transmitted light.

As shown in FIG. 8A, in another embodiment, an autostereoscopic display device may include a display pixel array 801 arranged orthogonally for generating display images. The display pixel array 801 comprises a plurality of display pixels 8 arranged along a row direction X and a column direction Y. For clarity of illustration, only a limited number of display pixels are shown in the drawings; however, in practical implementations, the display panel typically includes thousands of rows and thousands of columns of display pixels 8.

Figure 8B:
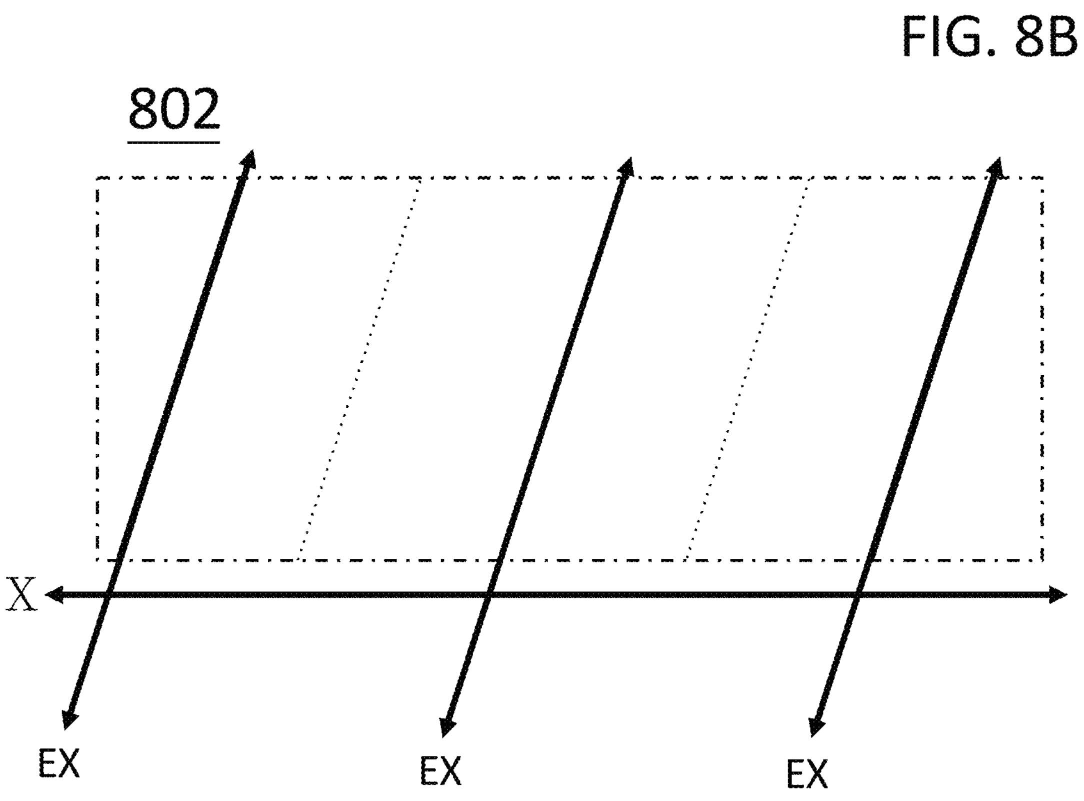

As shown in FIG. 8B, the autostereoscopic display device may further include an imaging arrangement configured to direct light emitted from different display pixels 8 toward different spatial locations, thereby enabling an observer to perceive stereoscopic three-dimensional images.

Figure 8C:
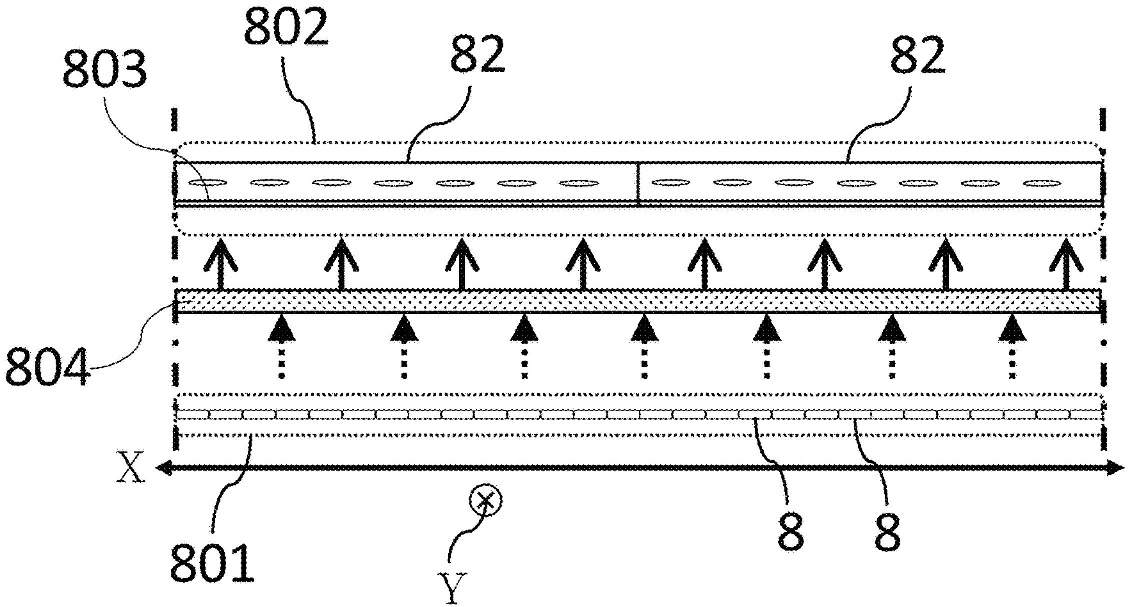
Figure 8D:
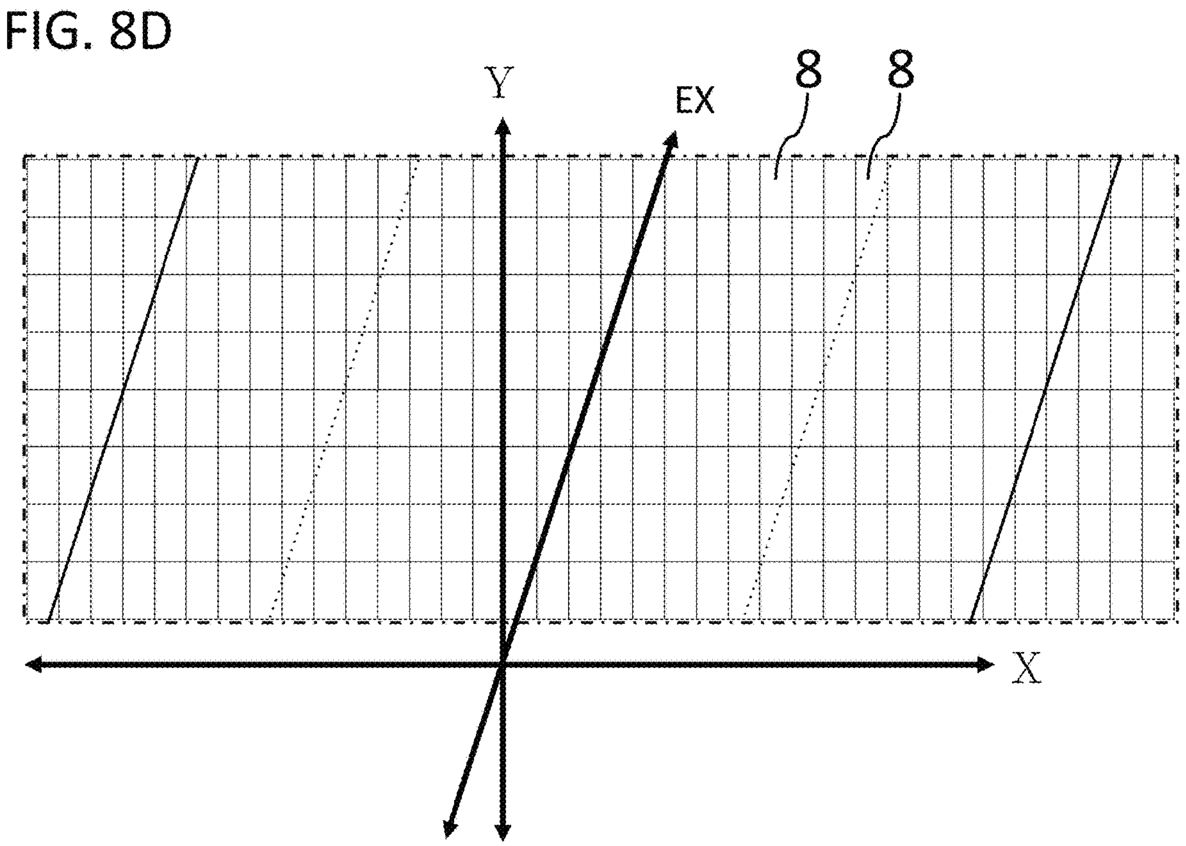

For example, as illustrated in FIGS. 8C and 8D, a liquid-crystal lens structure 802 may be disposed above the display pixel array 801. The liquid-crystal lens structure 802 includes a plurality of elongated lens units 82 extending substantially parallel to one another and overlying the display pixel array 801. Each elongated lens unit 82 extends along a lens direction EX that crosses the row direction X. The lens direction EX defines a geometric extension direction of the elongated lens units, while an effective optical axis of the liquid-crystal lens structure is determined by a liquid-crystal molecular alignment direction under an applied electric field, as described in the foregoing embodiments.

The imaging arrangement includes an electrically controllable lens device implemented in the form of an electrically adjustable lens array. The lens array may include a liquid-crystal material layer (liquid-crystal layer) sandwiched between electrode layers formed on first and second glass substrates disposed opposite to each other. Each electrode layer includes a transparent electrode structure, such as one formed of indium tin oxide (ITO). Each glass substrate is provided with an alignment layer that has been subjected to a mechanical rubbing process, wherein the alignment direction of the alignment layer on the glass substrate adjacent to the display panel is configured to be consistent with a polarization direction of light emitted from the display panel.

By designing electric-field regions having different field intensities within the lens units, the alignment states of liquid-crystal molecules in corresponding regions can be precisely controlled, thereby causing the liquid-crystal layer to exhibit a refractive-index distribution similar to that of a lens and thus altering its optical characteristics. By adjusting the electric-field intensity, the spatial distribution of the refractive index can be dynamically modified, thereby enabling focal-length variation and electrically controlled zooming functionality. This structure provides advantages of low cost, ease of control and facilitates selection of different operating modes of the display device.

The electrode patterns in the first electrode layer and the second electrode layer are preferably designed to have different shapes and are arranged in a mutually non-parallel manner, more preferably in a mutually perpendicular configuration. In this way, the electrode layers can define at least two sets of different lens axes, which may be selectively employed according to display orientation or viewing-angle requirements.

As shown in FIG. 8C, the autostereoscopic display device may further include a third alignment layer 803 disposed within the liquid-crystal lens structure 802. The third alignment layer 803 is subjected to a mechanical rubbing process to form a predetermined alignment direction, wherein the alignment direction is rubbed so as to be substantially perpendicular to the lens direction EX of the elongated lens units described above. Through such an alignment configuration, liquid-crystal molecules within the liquid-crystal lens structure 802 are caused to assume a stable and substantially uniform orientation, either in the absence of an externally applied electric field or under an operating electric field, thereby providing a foundational condition for establishing a desired refractive-index distribution and an effective optical axis of the liquid-crystal lens.

The display device may further include a half-wave plate 804 disposed between the display pixel array 801 and the third alignment layer 803. The half-wave plate 804 is configured to rotate a polarization direction of transmitted light such that the rotated polarization direction is aligned with the aforementioned alignment direction. In addition, a polarizer 30 may be disposed between the half-wave plate 804 and the third alignment layer 803 (as illustrated in FIG. 6), so as to further define and stabilize the polarization state of light entering the liquid-crystal lens structure.

Accordingly, based on the foregoing structure, an autostereoscopic display device according to the present embodiment may include: a display pixel array 801 comprising a plurality of display pixels 8 arranged orthogonally along a row direction X and a column direction Y, and configured to generate display images; a liquid-crystal lens structure 802 disposed above the display pixel array 801, the liquid-crystal lens structure 802 including a plurality of elongated lens units 82 extending substantially parallel to one another, each elongated lens unit 82 having a lens direction EX extending across the row direction X; the liquid-crystal lens structure 802 further including a liquid-crystal layer disposed between a first electrode layer and a second electrode layer arranged opposite to each other, wherein application of different electric-field intensities to different electrodes forms an electrically controllable refractive-index distribution within the liquid-crystal layer.

In one embodiment, transparent electrode patterns of the first electrode layer and the second electrode layer are arranged in a mutually non-parallel manner, for example in a substantially perpendicular configuration, thereby forming electric-field gradients oriented in different directions within the liquid-crystal layer. By selectively applying different driving schemes to the electrode layers, liquid-crystal molecules may be induced to form principal alignment orientations along different directions, such that the liquid-crystal lens structure defines at least two different effective lens axes. These effective lens axes may be selectively utilized to accommodate different display orientations or viewing-direction requirements, for example portrait-mode or landscape-mode viewing.

As used herein, the term “effective lens axis” refers to an equivalent optical principal axis of the liquid-crystal lens formed under an applied driving electric field, which is jointly determined by a principal alignment direction of liquid-crystal molecules and a principal direction of the refractive-index gradient within the liquid-crystal layer, rather than merely a geometric extension direction of the lens units.

The display device may further include: a third alignment layer 803 disposed within the liquid-crystal lens structure 802, the third alignment layer 803 having an alignment direction R formed by a rubbing process and arranged to be substantially perpendicular to the lens direction EX; a half-wave plate 804 disposed between the display pixel array 801 and the third alignment layer 803, the half-wave plate 804 being configured to rotate a polarization direction of transmitted light such that the rotated polarization direction is substantially aligned with the alignment direction R; and a polarizer 30 disposed between the half-wave plate 804 and the third alignment layer 803, configured to further define and purify a polarization state of light entering the liquid-crystal lens structure.

As used in this specification, the term “lens axis” or “effective optical axis” refers to an equivalent principal optical axis direction of a liquid-crystal lens when a driving electric field is applied, which is jointly determined by a primary orientation direction of liquid-crystal molecules and a principal direction of a refractive-index gradient formed within the liquid-crystal layer. Unless otherwise specified, the terms "lens axis" and "effective optical axis" are used interchangeably herein and have the same technical meaning.

In other words, when a liquid-crystal layer of a liquid-crystal lens is subjected to an electric-field configuration applied by a first electrode layer and a second electrode layer, such that a lens effect having a graded-index (GRIN) characteristic is formed within the liquid-crystal layer, a dominant optical direction associated with the lens effect is defined as the lens axis or the effective optical axis.

More specifically, for an elongated liquid-crystal lens unit, the lens axis generally corresponds to a primary alignment direction of liquid-crystal molecules, for example, an alignment direction defined by a third alignment layer. For an electrically controlled liquid-crystal lens implemented using patterned electrodes, the lens axis may alternatively be determined by an extending direction of a transparent electrode pattern or by a direction of an electric-field gradient generated thereby.

When a first electrode pattern and a second electrode pattern are arranged in a non-parallel configuration, such as a mutually perpendicular configuration, at least two different lens-axis directions may be correspondingly formed within the liquid-crystal layer. This enables the liquid-crystal lens to selectively switch between different lens axes so as to accommodate different display orientations or viewing-angle requirements.

Accordingly, the term "lens axis" or "effective optical axis" does not merely describe a geometric arrangement direction of the liquid-crystal lens, but instead denotes a dominant direction of its optical functionality, including, but not limited to, a focusing direction of the lens, a direction along which liquid-crystal molecules are guided to form a refractive-index gradient, and an optical-axis direction with which incident polarized light is required to be aligned during half-wave-plate polarization compensation.

In all embodiments of the present invention, the lens axis is used to define a target direction to which an incident polarization direction is rotated by a half-wave plate so as to achieve optimal optical-axis matching, such that a rotated polarization direction is substantially parallel to an alignment direction of the third alignment layer, thereby enabling the liquid-crystal lens to exhibit optimal optical performance.

Figure 9A:
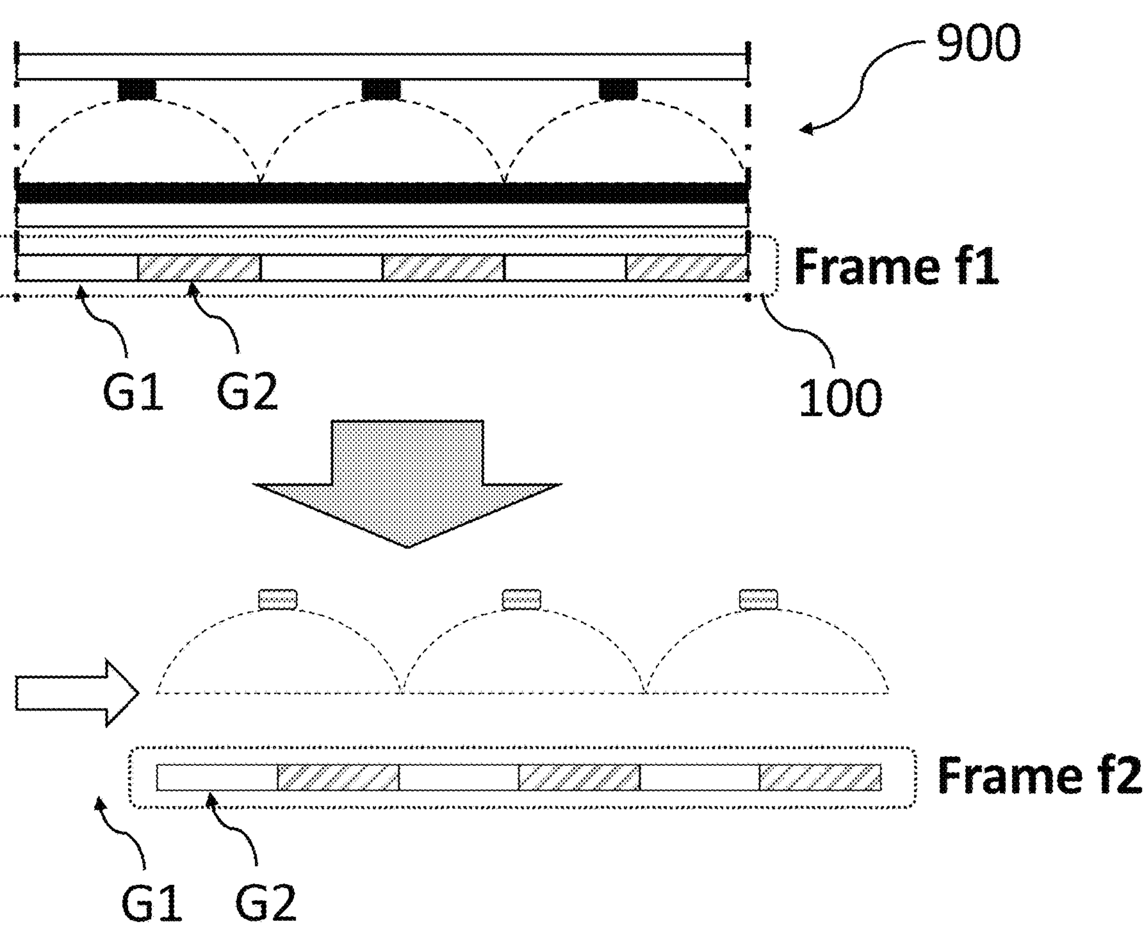
FIGS. 9A and 9B illustrate an embodiment in which the image segments corresponding to the right-eye image field and the left-eye image field are reassigned to different pixel groups in coordination with a switching of electrode configurations of a liquid-crystal lens.
Figure 9B:
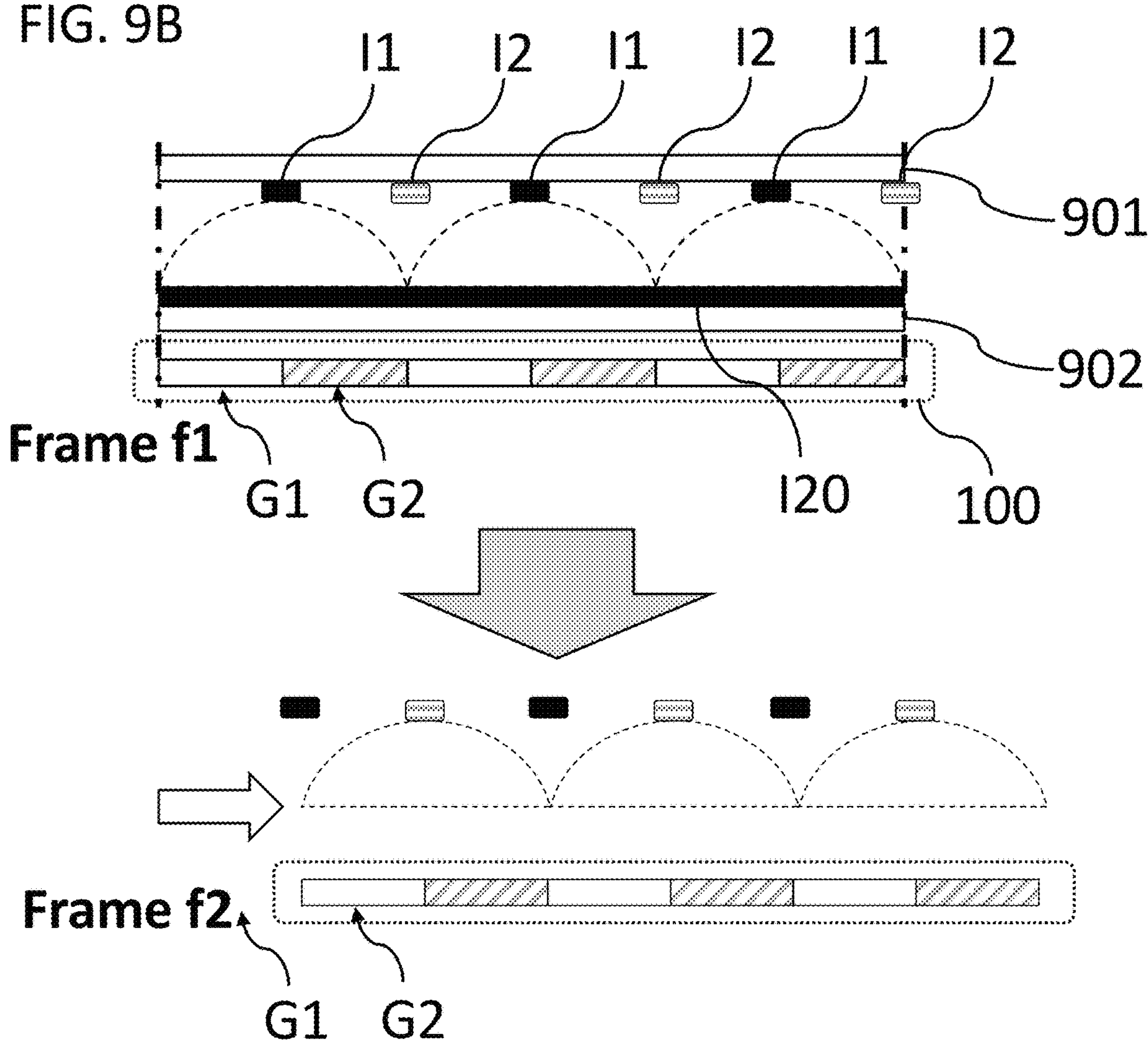

In another embodiment, as illustrated in FIGS. 9A and 9B, an electrically controllable liquid-crystal lens assembly 900 may include: a first substrate 901 and a second substrate 902 disposed opposite to each other; a liquid-crystal layer interposed between the first substrate 901 and the second substrate 902; a first electrode layer formed on the first substrate 901, the first electrode layer having a first transparent electrode pattern I1, I2, wherein the first transparent electrode pattern I1, I2 includes a plurality of first electrode finger portions extending in a first direction; a second electrode layer formed on the second substrate 902, the second electrode layer having a second transparent electrode pattern I20, wherein the second transparent electrode pattern I20 includes a plurality of second electrode finger portions extending in a second direction that is non-parallel to the first direction.

The mutually non-parallel arrangement of the first transparent electrode pattern I1, I2 and the second transparent electrode pattern I20 defines, within the liquid-crystal layer, at least two sets of different lens axes respectively corresponding to the first direction and the second direction; and by applying independently controlled electric-field intensities to the first electrode layer and the second electrode layer, a spatially varying refractive-index distribution is generated at different lateral positions within the liquid-crystal layer, thereby forming an electrically controllable graded-index (GRIN) lens and enabling electrical adjustment of a focal length or an optical-axis orientation of the lens.

In the embodiment, a liquid-crystal lens assembly 900 may include: a first substrate 901 and a second substrate 902 disposed opposite to each other; a liquid-crystal layer interposed between the first substrate 901 and the second substrate 902; a first electrode layer formed on the first substrate 901, the first electrode layer having first transparent electrode patterns I1 and I2, wherein the first transparent electrode patterns I1 and I2 include a plurality of first electrode finger portions extending along a first direction; and a second electrode layer formed on the second substrate 902, the second electrode layer having a second transparent electrode pattern I20, wherein the second transparent electrode pattern I20 includes a plurality of second electrode finger portions extending along a second direction that is non-parallel to the first direction.

The non-parallel arrangement between the first transparent electrode patterns I1 and I2 and the second transparent electrode pattern I20 defines, within the liquid-crystal layer, at least two different lens-axis orientations respectively corresponding to the first direction and the second direction. By independently applying electric-field strengths to the first electrode layer and the second electrode layer, a spatially varying refractive-index distribution is generated at different lateral positions within the liquid-crystal layer, thereby forming an electrically controllable graded-index (GRIN) liquid-crystal lens and enabling electrical adjustment of a focal length or a lens-axis orientation.

The first electrode layer and the second electrode layer of the liquid-crystal lens respectively include the transparent electrode patterns I1, I2, and I20. The electrode patterns may be composed of a plurality of electrode finger portions. As used herein, the term "electrode finger portions" refers to elongated electrode segments formed of a transparent conductive material, such as indium tin oxide (ITO), which are typically arranged in an interdigitated or stripe-like configuration. Each electrode finger portion may have a width on the order of several micrometers to several tens of micrometers, and may extend linearly or with a slight curvature along its extension direction, so as to generate an electric-field distribution having a spatial gradient within the liquid-crystal layer.

Because the refractive index of liquid-crystal material depends on the orientation state of liquid-crystal molecules under a local electric field, the shape, width, spacing, and extension direction of the electrode finger portions may be adjusted to precisely control the electric-field intensity distribution in different regions of the liquid-crystal layer. For example, when the electrode finger portions of the first electrode layer and those of the second electrode layer are arranged in non-parallel orientations, such as in mutually perpendicular directions, the resulting superposed electric-field distribution exhibits directional variations. As a result, at least two different lens-axis orientations may be selectively formed within the liquid-crystal layer, allowing the liquid-crystal lens to switch between different lens-axis orientations according to different driving electric-field configurations.

Accordingly, the liquid-crystal layer may be modulated to exhibit graded-index (GRIN) optical characteristics and to form a liquid-crystal lens having an electrically controllable focal length or an electrically controllable lens-axis orientation. By independently applying different voltage combinations to the first electrode layer and the second electrode layer, local electric fields of different magnitudes may be generated within the liquid-crystal layer, causing liquid-crystal molecules at different positions to undergo different degrees of reorientation and thereby altering the refractive-index distribution. In this manner, electrical adjustment of a focal length, an imaging direction, or a lens-axis orientation of the liquid-crystal lens can be achieved.

The electrode finger portion structures described herein enable highly controllable optical behavior of the liquid-crystal lens without significantly increasing fabrication complexity, and are particularly suitable for autostereoscopic display applications or multi-view display applications.

In another embodiment, as shown in FIG. 8C, a liquid-crystal lens structure 802 may include a plurality of elongated lens units 82 extending parallel to one another along a lens direction; a liquid-crystal layer corresponding to the elongated lens units; and a third alignment layer 803 disposed adjacent to the liquid-crystal layer. The third alignment layer 803 is subjected to a rubbing process to form an alignment direction that is substantially perpendicular to the lens direction. Accordingly, liquid-crystal molecules within the liquid-crystal layer are guided by the perpendicular alignment direction to obtain a uniform and consistent molecular arrangement, thereby stabilizing optical performance corresponding to the lens direction.

In the embodiment, as shown in FIG. 8C, an optical compensation structure for a liquid-crystal lens may include a liquid-crystal lens having an optical axis associated with a liquid-crystal alignment direction; and a half-wave plate 804 disposed in an optical path prior to the liquid-crystal lens. The half-wave plate 804 has a fast axis forming an angle θ relative to a polarization direction of incident linearly polarized light. By virtue of the fast axis, the half-wave plate rotates the polarization direction of the incident light by 2θ, such that the rotated polarization direction becomes substantially parallel to the optical axis of the liquid-crystal lens. The angle θ is selected such that the fast-axis orientation of the half-wave plate corresponds approximately to one half of an angular difference between a transmission axis of a preceding polarizer and the optical axis of the liquid-crystal lens, thereby compensating for optical-axis misalignment between the polarizer and the liquid-crystal lens.

As used herein, the term "fast axis" refers to a principal axis of a birefringent optical element along which light experiences a lower refractive index and thus propagates at a higher velocity. A half-wave plate utilizes the refractive-index difference between the fast axis and a slow axis to introduce a half-wave phase retardation between orthogonally polarized components of light, thereby rotating the polarization direction of linearly polarized light.

In order to improve the polarization quality of light prior to entering the liquid-crystal lens layer, the present invention provides the third polarizer disposed downstream of the half-wave plate and upstream of the liquid-crystal lens layer. As used herein, the terms "upstream" and "downstream" are technical terms describing positions along an optical path, wherein "upstream" refers to a position before light passes through a particular optical component, and "downstream" refers to a position after light has passed through that component. Accordingly, in this embodiment, the half-wave plate is located upstream in the optical path, while the third polarizer is disposed downstream of the half-wave plate and upstream of the liquid-crystal lens layer.

The half-wave plate is primarily configured to rotate the polarization direction of incident linearly polarized light. However, because the phase retardation of commercially available half-wave plates is wavelength-dependent, at wavelengths other than the design center wavelength (typically approximately 540 nm), the transmitted light may acquire elliptically polarized or circularly polarized components, such that the polarization state is no longer purely linear. To compensate for this effect, the present invention employs the third polarizer disposed downstream of the half-wave plate. The third polarizer has a transmission axis configured to allow passage only of linear-polarization components aligned with the transmission axis, while blocking polarization components that deviate from the transmission axis and fail to maintain a linear polarization state, such as elliptically polarized or circularly polarized components resulting from phase-retardation errors of the half-wave plate.

By virtue of this polarization-purification mechanism, even if polarization ellipticity is introduced by the half-wave plate at different wavelengths, such undesired polarization components can be effectively filtered out by the third polarizer. As a result, the transmitted light maintains a consistent and high-purity linear polarization state, with the polarization direction accurately aligned with the alignment direction defined by the alignment layer within the liquid-crystal lens layer. This configuration significantly enhances the optical stability of the liquid-crystal lens, improves light-transmission efficiency, increases contrast and image clarity in stereoscopic display applications, and reduces multi-view crosstalk caused by polarization mismatch.

Accordingly, as shown in FIG. 7A, in the embodiment, a polarization-purification module for a liquid-crystal lens system may include: a half-wave plate 704 configured to rotate a polarization direction of incident linearly polarized light; and a third polarizer 30 disposed downstream of the half-wave plate and upstream of a liquid-crystal lens layer, the third polarizer having a transmission axis; wherein the third polarizer allows only a linear-polarization component aligned with the transmission axis to pass therethrough; wherein elliptical-polarization or circular-polarization components generated due to wavelength-dependent phase-retardation variations of the half-wave plate 704 are blocked by the third polarizer 30; and wherein only a purified linear-polarization component aligned with the transmission axis is incident upon the liquid-crystal lens layer.

Figure 10A:
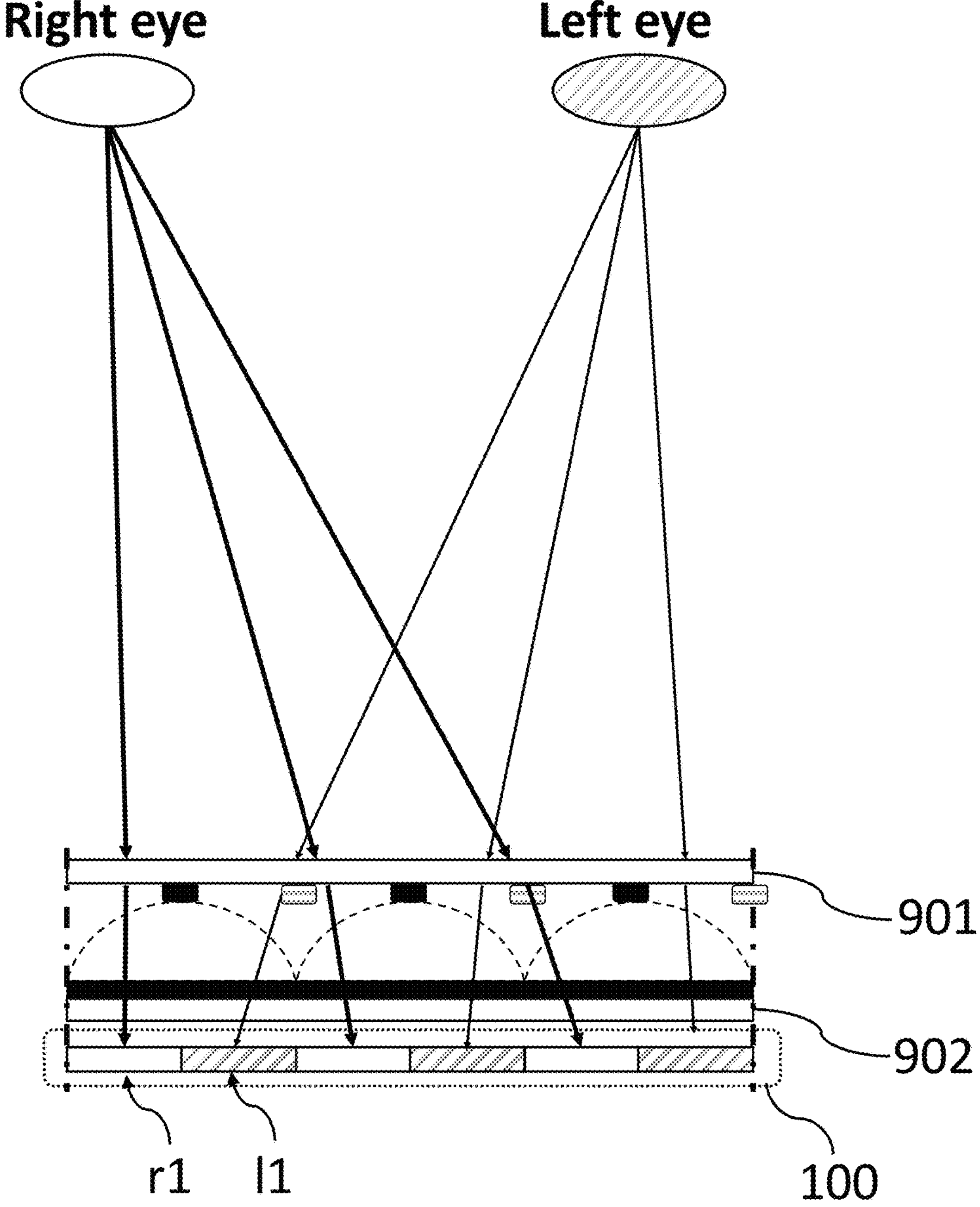
FIGS. 10A through 10H illustrate an embodiment of a stereoscopic display system employing a liquid-crystal lens, in which an effective electric-field position of the liquid-crystal lens is laterally shifted by selectively driving at least two sets of electrodes, and in which different electrode-pattern shapes are utilized to generate different electric-field distributions, thereby enabling variation of optical effects and viewing configurations.
Figure 10B:
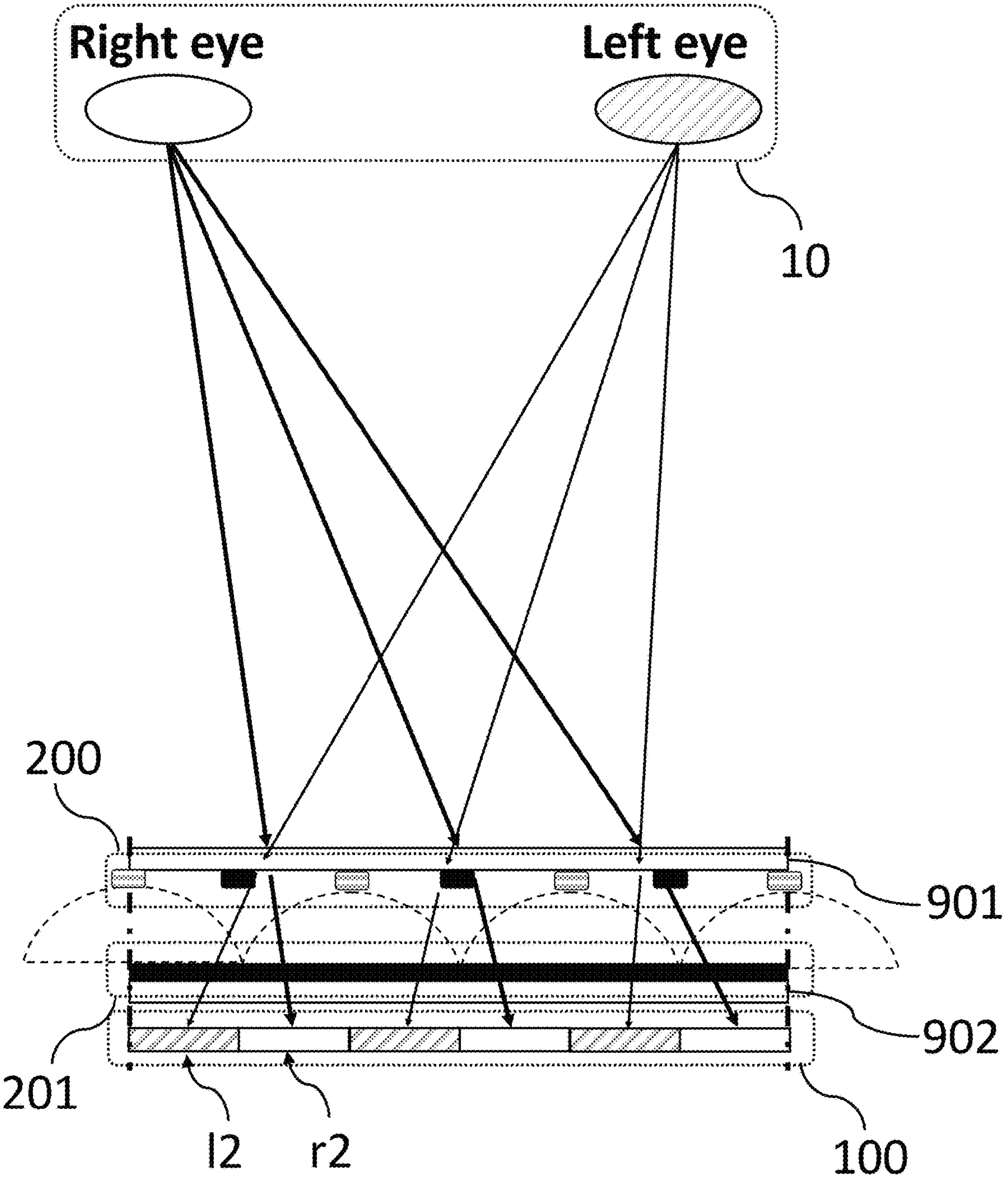

In another embodiment, as shown in FIGS. 10A and 10B, a stereoscopic image display system is provided, comprising: an image display screen 100 for displaying images; a display apparatus configured to cause left-eye images and right-eye images to be displayed on the image display screen 100 in a format of spaced image components, such that, at any given time, the image components define a left-eye image field l1, l2 interlaced with a right-eye image field r1, r2; a liquid-crystal (LC) lens system having a plurality of potential-applying components 200, 201, disposed between the image display screen and a stereoscopic image viewing position 10; and a control device configured to control which image components define the respective image fields, and to control electric potentials respectively applied to the potential-applying components 200, 201 so as to laterally shift an effective optical position of the LC lens, thereby enabling a viewer's right eye to view the right-eye image field r1, r2 and a viewer's left eye to view the left-eye image field l1,l2; wherein the control device is configured to autonomously, at different points in time, cause image components of the left-eye image field l1,l2 and contiguous image components of the right-eye image field r1,r2 to be simultaneously interchanged, thereby synchronously interchanging the displays of the left-eye image field l1,l2 and the right-eye image field r1,r2, and to simultaneously interchange the corresponding electric potentials applied to the potential-applying components 200,201 during the interchange of the image-field components, so as to generate the lateral shift and achieve the viewing effect described above, such that the viewer is able to view the interlaced image fields with the corresponding left eye and right eye both before and after the interchange of the image displays and the lateral shift.

As described above, a method of alternately reassigning image segments (i.e., different image fields of image content) to different viewing regions over multiple time intervals may be applied in conjunction with a liquid-crystal (LC) lens to improve resolution in a 3D display mode. In general, in an autostereoscopic 3D mode, because left-eye images and right-eye images must be displayed simultaneously, at least one-half of the display resolution is typically lost. By rapidly and alternately reassigning the image segments to different viewing regions, this "at least one-half" loss can be recovered. For example, as illustrated in FIG. 9A, in a frame f1, the rendered content includes image segments G1, G2, . . . corresponding respectively to right-eye images and left-eye images. If, in a subsequent frame f2, the right-eye images and left-eye images are reassigned to opposite image segments G2, G1, . . . , and frames f1 and f2 are continuously and rapidly alternated, the effective resolution can be doubled.

As illustrated in FIGS. 9A and 9B, a basic structure of a liquid-crystal lens 900 may include an upper transparent substrate 901, a lower transparent substrate 902, an electrode set I1, and an electrode set I2. When the electrode sets I1 and I2 are switched, the left-eye and right-eye image displays are simultaneously switched, thereby achieving resolution preservation.

Accordingly, a stereoscopic image display system may include: a display apparatus including a liquid-crystal lens element configured to laterally shift an effective electric-field position (for example, via at least two electrode sets I1 and I2), for providing left-eye images and right-eye images to a viewer located at a stereoscopic viewing position in the form of interleaved image components that define, at any given time, a left-eye image field (e.g., l1, l2) interlaced with a right-eye image field (e.g., r1, r2); and a controller coupled to the display means, for controlling which image components define the image fields and for controlling the liquid-crystal lens element such that the viewer's left eye views the left-eye image field and the viewer's right eye views the right-eye image field.

The controller is coupled to the display means and is configured to autonomously, from time to time, interchange the display of the left-eye image field and the right-eye image field (for example, frames 1, 3, 5, . . . displaying one assignment, and frames 2, 4, 6, . . . displaying another assignment), and to change the effective electric-field position of the liquid-crystal lens element during the image-field interchange (for example, by switching between electrode sets I1 and I2 while simultaneously switching the left-eye and right-eye image displays). In this manner, before and after the interchange, the viewer is able to continuously view the corresponding interleaved image fields through the respective left eye and right eye, thereby allowing the viewer to continuously perceive the corresponding stereoscopic image fields through the respective left eye and right eye both before and after the display interchange.

According to another aspect of the present invention, a stereoscopic image display system is provided, comprising: a display device configured to display images; a liquid-crystal (LC) lens element disposed in front of the display device, the liquid-crystal lens element including at least a first set of electrodes (e.g., I1) and a second set of electrodes (e.g., I2), the first and second sets of electrodes being configured to change an effective position of an electric field within the liquid-crystal lens, thereby laterally shifting an optical effect of the liquid-crystal lens, thereby forming, at any given time, a stereoscopic image field composed of interlaced image components respectively viewable by a left eye and a right eye; and a control circuit coupled to the display device and the liquid-crystal lens element, the control circuit being configured to: control the display device to generate a left-eye image and a right-eye image, and to divide the left-eye image and the right-eye image into a plurality of image segments that are alternately reassigned to different viewing regions over multiple time periods; control switching of the first set of electrodes and the second set of electrodes of the liquid-crystal lens element, such that the left-eye image field and the right-eye image field are interchanged in correspondence with reassignment of the image segments; and synchronously adjust the effective position of the electric field of the liquid-crystal lens element during interchange of the image fields, such that a viewer is able to continuously view corresponding stereoscopic image fields with the left eye and the right eye both before and after the interchange, thereby compensating for resolution loss typically associated with stereoscopic display operation.

In contrast to a related prior-art stereoscopic image display system disclosed in European Patent No. EP0713630B1, which achieves left-eye and right-eye image separation by means of variable-transparency shutter elements, the present application utilizes electrical potential control of a liquid-crystal (LC) lens to laterally shift an effective optical position of the lens, thereby actively directing image light toward the corresponding viewing eye of an observer. This technical concept differs fundamentally from the prior art in terms of optical principle, control methodology, and resulting technical effects. In particular, the prior art does not disclose or suggest synchronously controlling interchange of image fields together with lateral optical displacement of a liquid-crystal lens. Accordingly, the present application provides a technical solution that is clearly distinct from and non-obvious over the cited prior art, and therefore possesses significant inventive step, as the solution requires coordinated control of image-field reassignment and electrically induced optical-axis displacement.

For example, the key technical features of EP0713630B1 reside primarily in the image-domain processing, wherein left-eye and right-eye images are displayed in the form of interlaced image fields, and stereoscopic presentation is achieved by controlling which image components belong to the left-eye image field or the right-eye image field, with periodic interchange thereof. The optical separation mechanism employed in EP0713630B1 relies on a shutter system comprising variable-transparency shutter elements. The core control strategy involves synchronously switching the transparency states of the shutter elements during image-field interchange, so as to attenuate image components intended for the non-corresponding eye. Such a system is therefore fundamentally an attenuation-based stereoscopic display system, which achieves stereoscopic separation by selectively blocking undesired light rather than actively redirecting image light through optical displacement.

Although the present embodiment appears superficially similar to the prior art with respect to the concept of "image-field interchange," it differs fundamentally in optical implementation mechanisms and control hierarchy.

The present invention introduces a liquid-crystal (LC) lens system, in which electrical potentials applied to the LC lens are used to control an effective optical position thereof. Instead of employing attenuation-based light blocking, the present invention utilizes a lateral displacement of an effective optical position to actively guide image light, such that the left eye and the right eye respectively receive their corresponding and updated image fields.

In particular, laterally shifting an effective electric-field position by means of at least two electrode sets is entirely different from transparency switching. In the present invention, different voltage configurations applied to multiple electrode sets directly induce a lateral displacement of an effective refractive-index distribution within the liquid-crystal lens. By contrast, the prior art merely controls transparent or opaque states of shutter elements. For example, EP0713630B1 relies on attenuation mechanisms to prevent an incorrect eye from receiving image content, wherein the shutter elements affect only light intensity and do not alter a propagation path of light. In the present invention, however, the lateral optical displacement produced by the LC lens directly modifies propagation paths of image light. Whereas conventional techniques "block incorrect light," the present invention "guides light to a correct spatial position." Such a distinction lies at the level of optical principles and does not represent an equivalent substitution that would be readily apparent to a person having ordinary skill in the art.

Although both approaches refer to "synchronous control during image-field interchange," the synchronous control in EP0713630B1 merely involves switching transparency states of shutter elements during image-field interchange, which constitutes a logical-level attenuation-based coordination. In contrast, synchronous control in the present invention refers to simultaneously controlling lateral displacement of an effective optical position of the liquid-crystal lens and interchanging image fields while updating corresponding image content. This process requires precise voltage configurations, dynamic modulation of refractive-index distributions within the liquid-crystal lens, and coordinated updating of displayed image fields. At the same time, the present invention improves light-use efficiency, reduces attenuation loss, and compensates for resolution degradation inherent in stereoscopic display operation.

EP0713630B1 neither discloses switching applied electrical potentials to produce a lateral optical displacement in a liquid-crystal lens, nor discloses synchronously controlling image-field interchange in correspondence with such lateral optical displacement. A person having ordinary skill in the art would have no motivation to introduce a liquid-crystal lens system having multiple potential-applying components and to replace an attenuation-based shutter mechanism with a lateral optical displacement mechanism as disclosed herein.

Figure 10C:
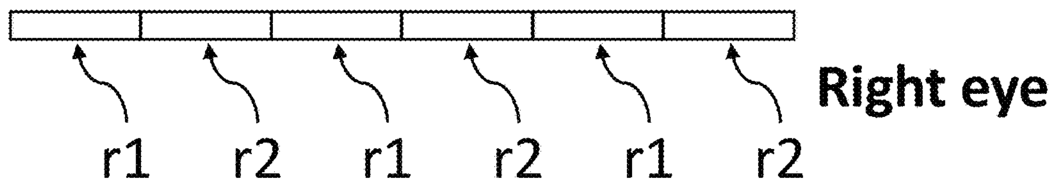
Figure 10C:
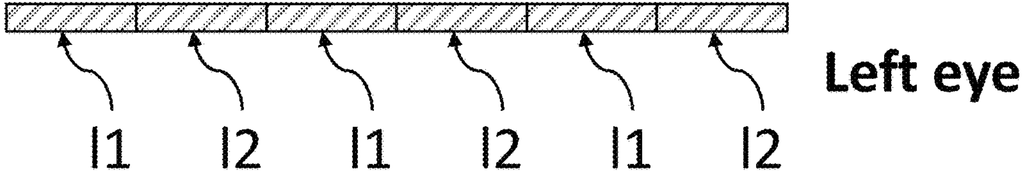

Furthermore, as illustrated in FIGS. 10A and 10B, at frame f1, the image contents r1 and l1 corresponding to the right-eye and left-eye image fields differ from the image contents l2 and r2 corresponding to the left-eye and right-eye image fields at frame f2, such that the viewer's visual system reconstructs, as shown in FIG. 10C, complete right-eye and left-eye image fields over time. In other words, the image contents comprise at least four distinct sets of content (e.g., r1, l1, l2, and r2) that define at least one left-eye image field and at least one right-eye image field arranged in an interlaced manner. This implementation is fundamentally different from conventional techniques that prepare only two sets of content (e.g., one left-eye image and one right-eye image).

Figure 10D:
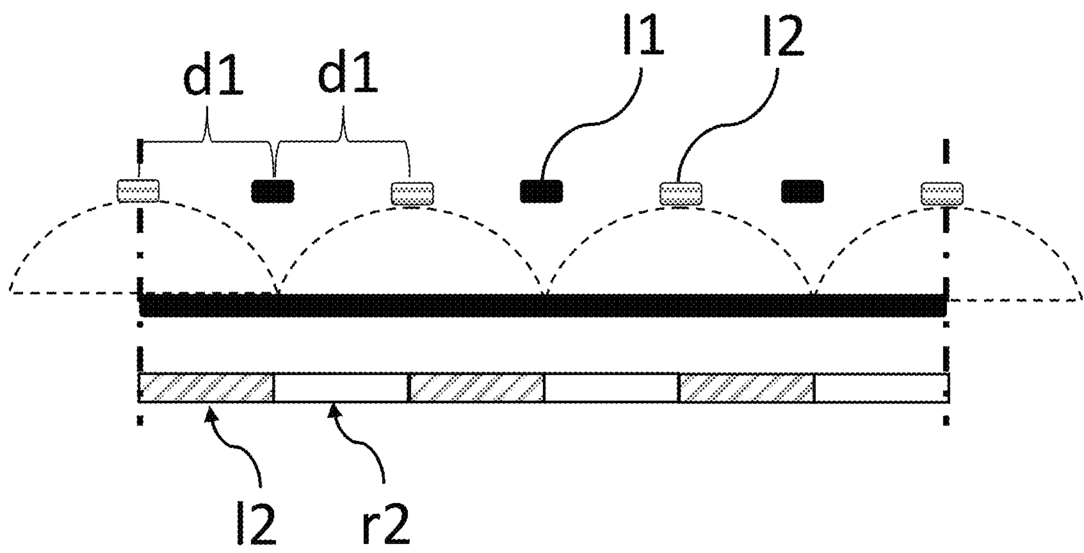
Figure 10E:
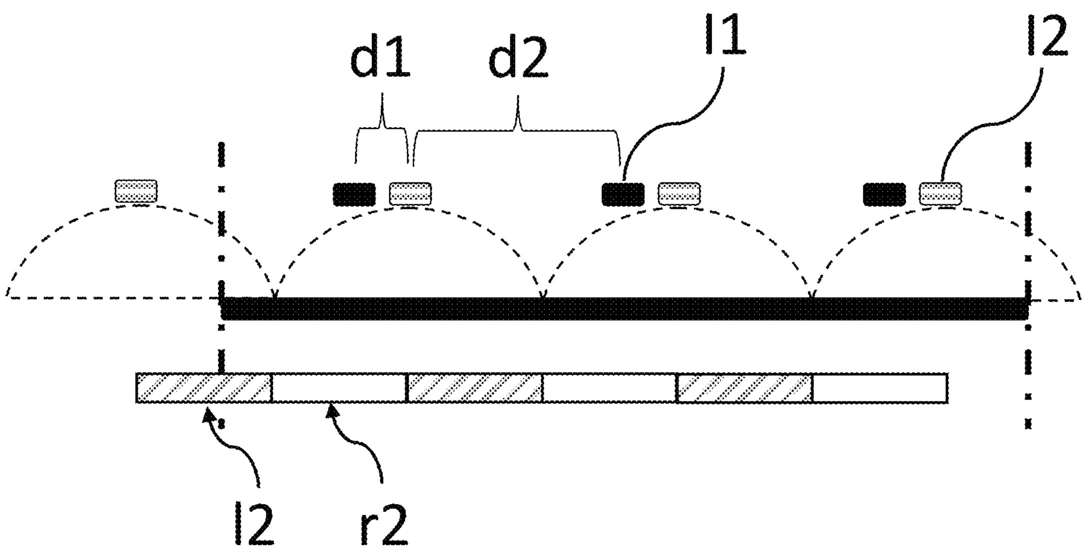
Figure 10F:
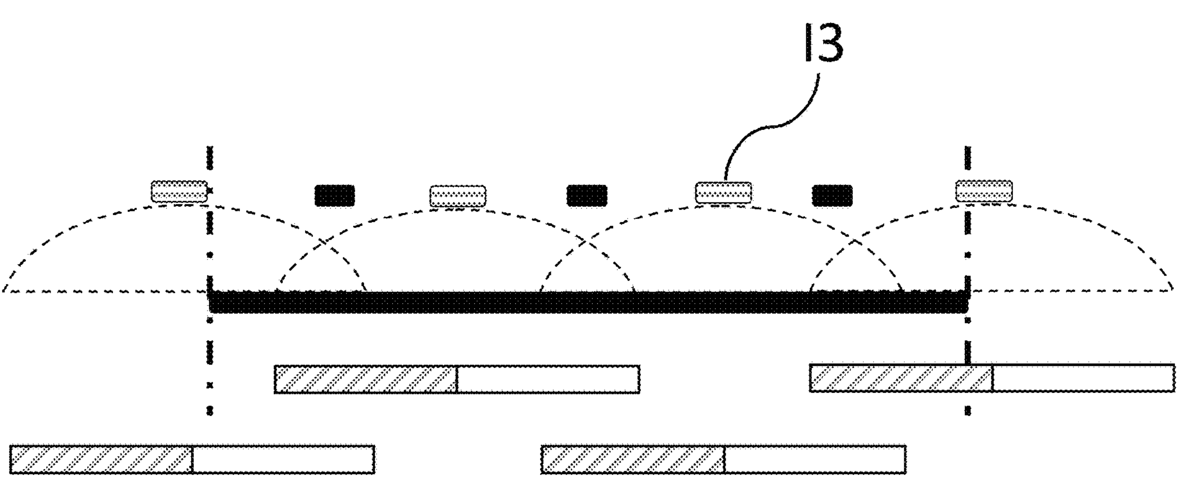
Figure 10G:
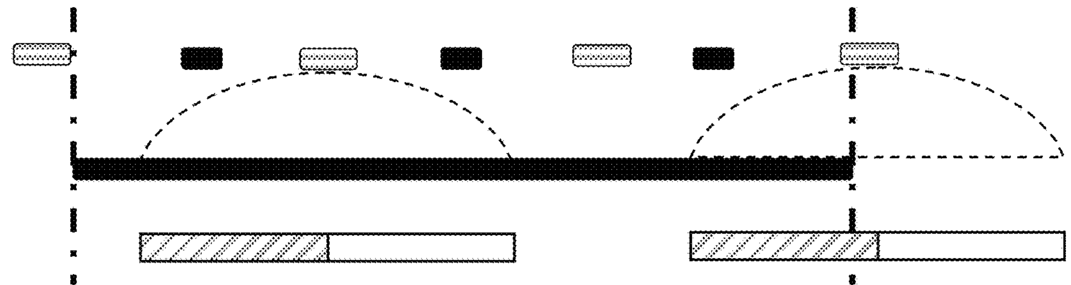
Figure 10H:
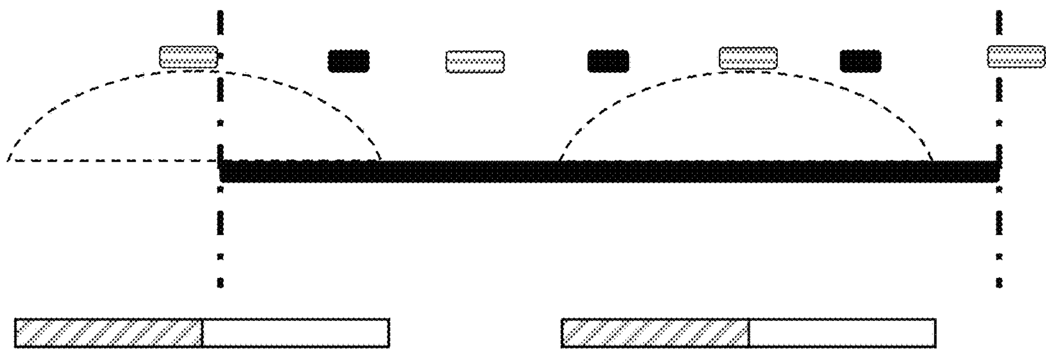

As illustrated in FIGS. 10D and 10E, the relative positions of the first set of electrodes (e.g., I1) and the second set of electrodes (e.g., I2) may be further adjusted to increase the range of achievable display effects. As illustrated in FIGS. 10F, 10G, and 10H, the shapes of the first set of electrodes and the second set of electrodes may also be modified to generate different electric-field distributions, thereby further expanding the available display-effect variations. In addition, as illustrated in FIGS. 10F, 10G and 10H, a third set of electrodes (e.g., 13) may be provided and applied to other set of frames to further increase the diversity of display effects.

Accordingly, by replacing a conventional shutter system with a liquid-crystal lens element and providing at least two sets of electrodes such that an effective optical position of the liquid-crystal lens undergoes lateral displacement, the display system can substantially increase the variety and flexibility of achievable display effects. The foregoing structures and configurations are capable of enhancing brightness, contrast, and viewing angle, while substantially increasing the range of display-effect variations that can be provided. As a result, the autostereoscopic display device of the present invention is well suited for a wide variety of application scenarios, including but not limited to gaming, medical imaging, and virtual-reality applications.

The invention therefore provides a practical and scalable solution for improving image fidelity and enhancing user experience in autostereoscopic display technologies. All modifications and variations of the present invention that fall within the scope defined by the appended claims are intended to be encompassed within the protection of the present invention.

The invention claimed is:

1. An autostereoscopic display device, comprising:

a liquid-crystal panel, the liquid-crystal panel comprising: a plurality of display pixels configured to generate images, the display pixels being arranged in rows and columns to form a display pixel array and to define a row direction and a column direction; a first alignment layer; a second alignment layer; and a first liquid-crystal layer disposed between the first alignment layer and the second alignment layer, wherein an alignment direction of the first alignment layer is substantially orthogonal to an alignment direction of the second alignment layer;

a backlight module;

a first polarizer disposed above the backlight module;

a second polarizer disposed above the second alignment layer;

a half-wave plate disposed above the second polarizer; and a liquid-crystal lens array disposed above the half-wave plate, wherein the liquid-crystal lens array comprises a plurality of lens units extending parallel to one another, the lens units being configured to form a plurality of pixel groups on the display pixel array, and to define boundaries between adjacent pixel groups so as to produce a multi-view separation effect required for stereoscopic image display.

2. The autostereoscopic display device of claim 1, wherein the liquid-crystal lens array is configured to be disposed at a fixed inclination angle relative to the row direction of the display pixel array, and wherein a lens direction of the liquid-crystal lens array extends at the fixed inclination angle relative to the row direction.

3. The autostereoscopic display device of claim 2, wherein the liquid-crystal lens array comprises a second liquid-crystal layer, and wherein a third alignment layer is disposed in the second liquid-crystal layer, the third alignment layer having an alignment direction configured to be substantially perpendicular to the lens direction of the liquid-crystal lens array.

4. The autostereoscopic display device of claim 3, wherein the half-wave plate is configured to rotate a polarization direction of light emitted from the second polarizer, such that the rotated polarization direction is substantially aligned with an effective optical axis formed by the lens units of the liquid-crystal lens array when a driving electric field is applied, wherein the effective optical axis is an equivalent optical axis determined by a principal orientation direction of liquid-crystal molecules and a principal direction of a refractive-index gradient of the liquid-crystal lens under the applied driving electric field.

5. A display device, comprising:

a liquid-crystal panel configured to display images, the liquid-crystal panel comprising: a first alignment layer; a second alignment layer disposed above the first alignment layer; and a liquid-crystal layer disposed between the first alignment layer and the second alignment layer, wherein an alignment direction of the first alignment layer is substantially orthogonal to an alignment direction of the second alignment layer;

a backlight module;

a first polarizer disposed between the backlight module and the first alignment layer, the first polarizer having a transmission axis substantially parallel to the alignment direction of the first alignment layer;

a second polarizer disposed above the second alignment layer, the second polarizer having a transmission axis substantially parallel to the alignment direction of the second alignment layer;

a liquid-crystal lens disposed above the second polarizer; and a half-wave plate disposed between the second polarizer and the liquid-crystal lens, the half-wave plate being configured to rotate a polarization direction of light incident on the liquid-crystal lens.

* * * * *